US012414143B2

(12) United States Patent
Rai et al.

(10) Patent No.: US 12,414,143 B2
(45) Date of Patent: Sep. 9, 2025

(54) METHODS AND SYSTEMS FOR DETERMINING DSS POLICY BETWEEN MULTIPLE RATs

(71) Applicant: SAMSUNG ELECTRONICS CO., LTD., Suwon-si (KR)

(72) Inventors: Jagadishchandra Kodankiri Rai, Bangalore (IN); Godavarti Satya Venkata Uma Kishore, Bangalore (IN); Vimal Bastin Edwin Joseph, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 515 days.

(21) Appl. No.: 17/832,217

(22) Filed: Jun. 3, 2022

(65) Prior Publication Data

US 2023/0284254 A1    Sep. 7, 2023

Related U.S. Application Data

(63) Continuation of application No. PCT/KR2022/007180, filed on May 19, 2022.

(30) Foreign Application Priority Data

Jun. 4, 2021 (IN) ............................. 202141024964
Mar. 4, 2022 (IN) ............................. 202141024964

(51) Int. Cl.
*H04W 72/542* (2023.01)
*H04W 16/14* (2009.01)

(52) U.S. Cl.
CPC ......... *H04W 72/542* (2023.01); *H04W 16/14* (2013.01)

(58) Field of Classification Search
CPC ........................... H04W 72/542; H04W 16/14
See application file for complete search history.

(56) References Cited

U.S. PATENT DOCUMENTS

2013/0275346 A1    10/2013    Srikanteswara et al.
2016/0057666 A1*   2/2016     Pang ..................... H04W 24/10
                                                    370/252
2016/0373237 A1*   12/2016    Shellhammer ........ H04L 7/0012
(Continued)

FOREIGN PATENT DOCUMENTS

WO    WO-2021002866 A1 *  1/2021  ........... H04L 5/0062
WO    WO-2021161217 A1 *  8/2021  ........ H04W 52/0216

OTHER PUBLICATIONS

India Office Action dated Dec. 22, 2022 for IN Application No. 202141024964.
(Continued)

*Primary Examiner* — Joseph E Avellino
*Assistant Examiner* — Maryam Emadi
(74) *Attorney, Agent, or Firm* — NIXON & VANDERHYE P.C.

(57) ABSTRACT

A method may include determining a dynamic spectrum sharing (DSS) policy in a two stage approach. In a stage, the method may include determining radio resource requirements of each user equipment (UE) among active UEs using an individual UE resource scaling factor. In another stage, the method may include determining the DSS policy based on cumulative radio resource requirements of the active UEs determined based on the individual UE resource scaling factor, and DSS scaling factors.

19 Claims, 29 Drawing Sheets

(56) References Cited

U.S. PATENT DOCUMENTS

| | | | |
|---|---|---|---|
| 2017/0359731 A1 | 12/2017 | Soldati et al. | |
| 2019/0045370 A1 | 2/2019 | Al-Fanek et al. | |
| 2019/0349960 A1 | 11/2019 | Li et al. | |
| 2020/0266910 A1 | 8/2020 | O'Shea et al. | |
| 2021/0153066 A1 | 5/2021 | Guha et al. | |
| 2022/0046453 A1* | 2/2022 | Lee | H04W 76/27 |
| 2024/0333448 A1* | 10/2024 | Frenne | H04L 5/0048 |

OTHER PUBLICATIONS

European Search Report dated Jul. 15, 2024 for EP Application No. 22816353.1.

Challita et al., XP 81890446 A Deep Reinforcement Learning for Dynamic Spectrum Sharing of LTE and NR; Feb. 22, 2021.

PCT International Search Report dated Aug. 12, 2022 for PCT/KR2022/007180.

PCT Written Opinion dated Aug. 12, 2022 for PCT/KR2022/007180.

Challita et al., Deep Reinforcement Learning for Dynamic Spectrum Sharing of LTE and NR, Ericsson Research, Feb. 1, 2021, 7pgs.

"Dynamic Spectrum Sharing" Technical White Papers, Jan. 22, 2021, 29pgs.

On-line article at website thefastmode.com, by Ray Sharma, "Verizon Completes Dynamic Spectrum Sharing Technology Trials", Jun. 23, 2020, 6 pp., at URL: https://www.thefastmode.com/technology-solutions/17398-verizon-completes-dynamic-spectrum-sharing-technology-trials.

On-line article at website fiercewireless.com, by Bevin Fletcher, "AT&T to deploy dynamic spectrum sharing in second half of 2020", May 28, 2020, 5 pp., at URL: https://www.fiercewireless.com/tech/at-t-to-deploy-dynamic-spectrum-sharing-second-half-2020.

On-line article at website Ericsson.com, News, by unknown, "Breakthrough 5G data call using dynamic spectrum sharing to accelerate nationwide 5G deployments", Sep. 4, 2019, 4 pp., at URL: https://www.ericsson.com/en/news/2019/9/ericsson-spectrum-sharing.

On-line article at website nokia.com, by Harri Holma, "Nokia to Launch Dynamic Spectrum Sharing Solution in 2020", Dec. 9, 2019, 4 pp, at URL: https://www.nokia.com/blog/nokia-launch-dynamic-spectrum-sharing-solution-2020.

On-line article at website fiercewireless.com, by Monica Alleven, "Verizon's DSS performance 'disappointing', says SRG", Dec. 4, 2020, 6 pp., at URL: https://www.fiercewireless.com/operators/verizon-s-dss-performance-disappointing-says-srg.

On-line article at website businesswire.com, by unknown, "5G Benchmark Study 2020: Dynamic Spectrum Sharing (DSS), Based on Verizon's Networks in Minneapolis (CRS-RM) and Oklahoma City (MBSFN), as Well as AT&T's Network in Plano, Texas (CRS-RM)—ResearchandMarkets.com", Dec. 21, 2020, 3 pp., at URL: https://www.businesswire.com/news/home/20201221005507/en/5G-Benchmark-Study-2020-Dynamic-Spectrum-Sharing-DSS-Based-on-Verizons-Networks-in-Minneapolis-CRS-RM-and-Oklahoma-City-MBSFN-as-Well-as-ATTs-Network-in-Plano-Texas-CRS-RM---ResearchAndMarkets.com.

* cited by examiner

| Range | Mapped value |
|---|---|
| 0 ... X | a |
| X+1 ... X+k | b |
| ... | ... |
| ... | ... |
| X + p ... N | n |

Pre-defined table for KPI metric value mapping

FIG. 4A

| Range | Mapped value |
|---|---|
| 0 ... 5 | 1 |
| 6 ... 12 | 2 |
| ... | ... |
| ... | ... |
| 22 ... 28 | n |

Pre-defined table for MCS value mapping

FIG. 4B

| Metric | Offset width |
|--------|--------------|
| SINR | x |
| MPR | y |
| MCS | z |
| ... | ... |
| ... | ... |

Pre-defined table for
KPI metric offset width

FIG. 17B

| Metrics | | | |
|---|---|---|---|
| Link adaptation | | Power control | |
| CQI | Channel quality indicator | OLPC | Open loop power control |
| SINR | Signal to interference noise ratio | TA | Timing advance |
| OLRC | Outerloop rate control | TPC | Transmit power control |
| MCS | Modulation and coding scheme | PHR | Power headroom report |
| PMI | Precoding matrix indicator | | Multi-input multi-output(MIMO) |
| MPR | Maximum power reduction | SM | Spatial multiplexing |
| QAM | Quadrature amplitude modulation | SU-MIMO | Single-user MIMO |
| BLER | Block error | MU-MIMO | Multi-user MIMO |
| Other | | TD | Transmit diversity |
| BO | Buffer occupancy | TM | Transmit mode |
| TP | Throughput | RI | Rank indicator |
| PRB | Physical resource blocks | | Signals/system info |
| PAD | Padding | SSB | Synchronization signal block |
| RLF | Radio link failure | CSI-RS | CSI reference signals |
| DRX | Discontinuous reception | TRS | Tracking reference signals |
| SCS | Sub carrier spacing | PRS | Positioning reference signals |
| Rebx | Retransmission | SIB | System information |
| CA | Carrier aggregation | MIG | Measurement gap |
| VONR | Voice over NR | CRS | Cell specific reference signal |
| IMD | Intermodulation distortion | SRS | Sounding reference signal |

FIG. 19

METHODS AND SYSTEMS FOR DETERMINING DSS POLICY BETWEEN MULTIPLE RATs

CROSS-REFERENCE TO RELATED APPLICATIONS

This application is a continuation of International Application No. PCT/KR2022/007180 designating the United States, filed on May 19, 2022, in the Korean Intellectual Property Receiving Office and claiming priority to Indian Provisional Patent Application No. 202141024964, filed on Jun. 4, 2021, in the Indian Patent Office and to Indian Complete Patent Application No. 202141024964, filed on Mar. 4, 2022, in the Indian Patent Office, the disclosures of all of which are incorporated by reference herein in their entireties.

BACKGROUND

Field

The disclosure relates to the field of wireless networks and for example to determining a dynamic spectrum sharing (DSS) policy between multiple radio access technologies (RATs) using a reinforcement learning (RL).

Description of Related Art

Dynamic spectrum sharing (DSS)/DSS policy deploys multiple radio access technologies (RATs) (multi-RATs) in a same frequency band, which may reduce inefficiency of usage of a spectrum comparing to spectrum re-framing. With the DSS, the multiple RATs may share the same spectrum, between each other. The DSS requires multi-RAT scheduling coordination and restriction as well as standard co-existence mechanisms. The DSS may be either a slot based DSS (S-DSS), or a frame based DSS (F-DSS) according to an operator configuration. In the F-DSS, sharing of radio resources between the multiple RATs may be in a time domain of a radio frame. In the S-DSS, sharing of the radio resources between the multiple RATs may be in a frequency domain of each radio slot. The DSS/DSS policy may include a DSS pattern and a DSS pattern duration.

In an existing virtualized distributed unit (DU) design, a long term evolution (LTE) network and new radio network (NR) (examples of the RATs) may be virtualized into a single cloud server using various virtualization technologies such as kubernetes, docker, virtual machines (VMs), and so on. In such a design, an NR to LTE communication (typically including a medium access control (MAC) to MAC communication) may have significantly lesser delay compared to traditional DU to DU communication. A DSS coordinator coupled with the LTE and the NR may determine which DSS patterns to apply to each radio slot based on pre-defined resource sharing policy and transmits the DSS patterns to LTE and NR schedulers front haul switching unit (FSU), which plays a role of multiplexing/de-multiplexing of NR and LTE signals.

FIGS. 1A, and 1B are example diagrams depicting an example existing method for determining the DSS among the multiple RATs with lower spectral efficiency.

In the existing method of FIGS. 1A-1B, a trade-off between a resource sharing granularity and implementation complexity based several resource sharing patterns may be pre-defined. The DSS policy may be determined for every radio slot/frame based on a traffic status, and a resource usage status of the RATs, and a number of active user equipments (UEs) and a buffer occupancy of the active UEs. However, such a determined DSS policy may be dependent on the pre-defined resources and fixed linear dimensions of traffic need/requirement of each UE. Thus, leading to lower spectral efficiency, degradation of user experience, and persistent transmission/reception errors.

SUMMARY

Certain example embodiments of the disclosure provide methods and/or systems for determining a dynamic spectrum sharing (DSS) policy among multiple radio access technologies (RATs).

Certain example embodiments of the disclosure provide methods and/or systems for determining a user equipment (UE) resource scaling factor for each of a plurality of UEs, determining radio resource requirements of each UE using a UE resource scaling factor of each UE, and determining a cumulative radio resource requirements of the plurality of UEs based on the radio resource requirements of each UE.

Certain example embodiments of the disclosure provide methods and/or systems for determining the DSS policy for scheduling the radio resources based on at least one of the cumulative radio resource requirements of the plurality of UEs, cell key performance indicator (KPI) metrics, and a plurality of DSS scaling factors, wherein the plurality of DSS scaling factors include a DSS pattern scaling factor, and a DSS pattern duration scaling factor.

Certain example embodiments of the disclosure provide methods and/or systems for determining a dynamic spectrum sharing (DSS) policy between multiple radio access technologies (RATs). A method may include determining a UE resource scaling factor for each of a plurality of user equipments (UEs). The method may include determining radio resource requirements of each of the plurality of UEs using the UE resource scaling factor of each UE. The method may include determining a cumulative radio resource requirements of the plurality of UEs based on ("based on" as used herein covers based at least on) the radio resource requirements of each UE. The method may include determining the DSS policy for scheduling the radio resources based on the cumulative radio resource requirements of the plurality of UEs, cell key performance indicator (KPI) metrics, and a plurality of DSS scaling factors.

Certain example embodiments of the disclosure may provide a radio access network (RAN) comprising a memory and a controller coupled to the memory. The controller may be configured to determine a UE resource scaling factor for each of a plurality of user equipments (UEs). The controller may be configured to determine radio resource requirements of each of the plurality of UEs using the UE resource scaling factor of each UE. The controller may be configured to determine a cumulative radio resource requirements of the plurality of UEs based on the radio resource requirements of each UE. The controller may be configured to determine the DSS policy for scheduling the radio resources based on one or more of the cumulative radio resource requirements of the plurality of UEs, cell key performance indicator (KPI) metrics, and a plurality of DSS scaling factors, and preferably based on each of these.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which:

FIG. 4A is a diagram illustrating a pre-defined table for key performance indicator (KPI) metric value mapping, according to various example embodiments;

FIG. 4B is a diagram illustrating a pre-defined table for modulation and coding scheme (MCS) metric value mapping, according to various example embodiments;

FIGS. 17A, and 17B are diagrams illustrating example DSS patterns determined across a long term evolution (LTE) network and a new radio (NR) network, according to various example embodiments;

FIG. 19 is a table depicting examples of UE KPI metrics, according to various example embodiments;

DETAILED DESCRIPTION

Figure 1A:
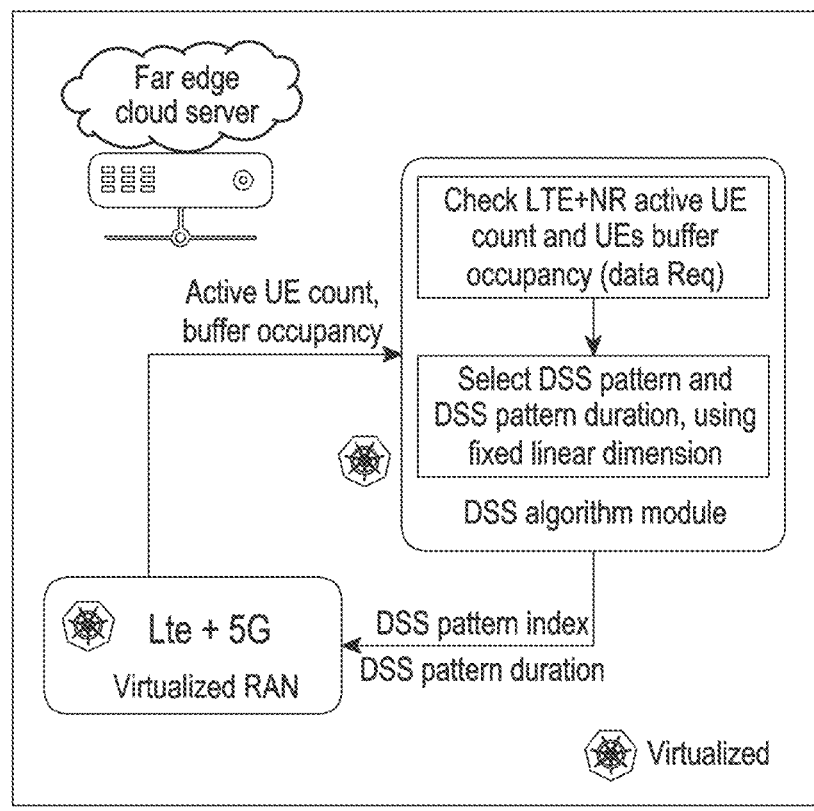
FIGS. 1A, and 1B are diagrams depicting an existing method for determining dynamic spectrum sharing (DSS) among multiple radio access technologies (RATs) with lower spectral efficiency.
Figure 1B:
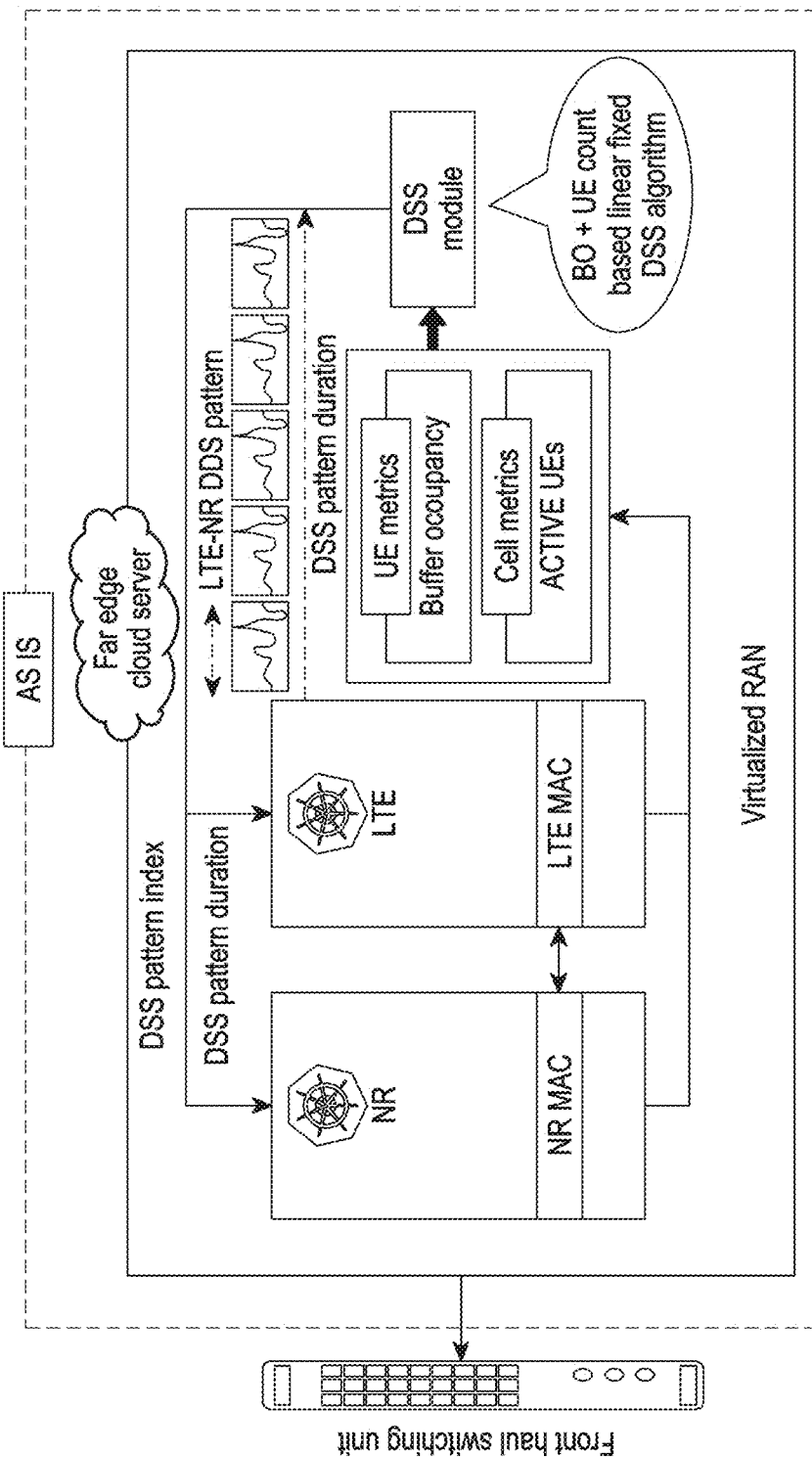

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Example embodiments herein disclose methods and systems for using a reinforcement learning (RL) for determining a dynamic spectrum sharing (DSS) across multiple radio access technologies (RATs) to maximize and/or improve spectral efficiency by re-iterating varying channel conditions and predicting efficient spectrum scaling factors.

Referring now to the drawings, and more particularly to FIGS. 2 through 26, where similar reference characters denote corresponding features consistently throughout the figures, there are shown several example embodiments.

Figure 2:
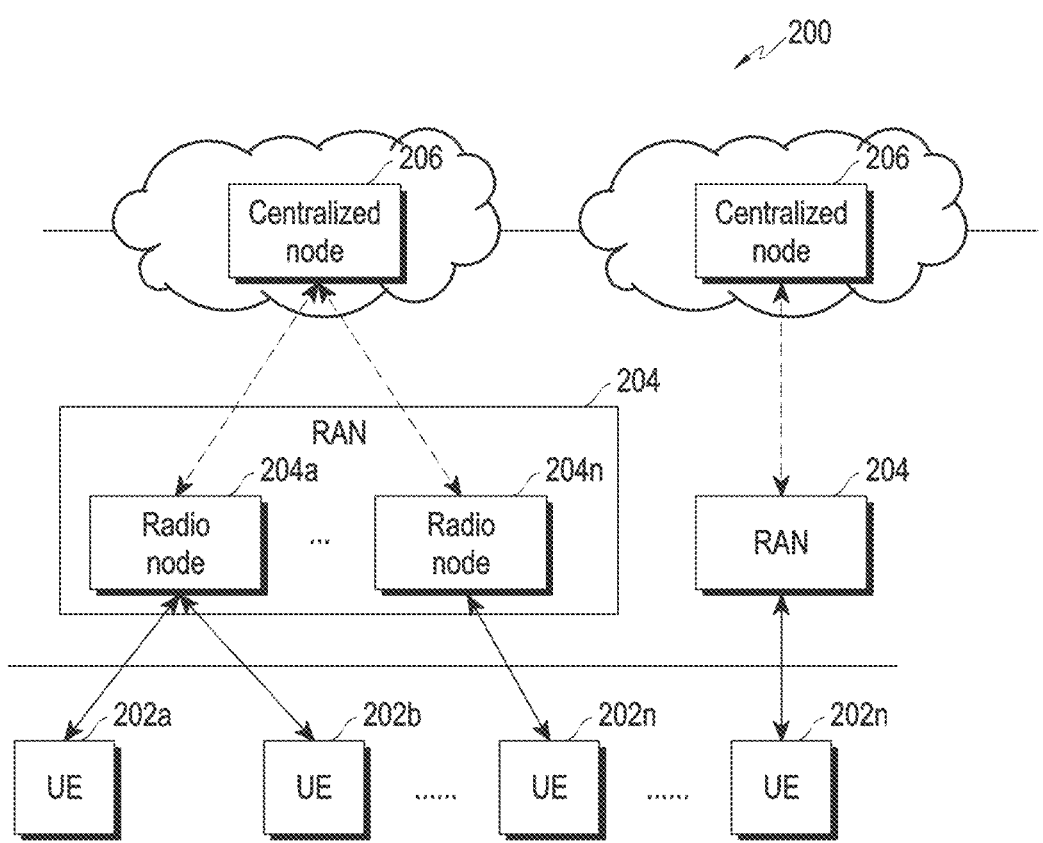
FIG. 2 is a diagram illustrating an example wireless network/DSS system, according to various example embodiments.

FIG. 2 depicts a wireless network/DSS system 200, according to certain example embodiments disclosed herein.

The DSS system 200 may be at least one of a centralized radio access network (RAN) network, a cloud RAN network, an open-RAN network (O-RAN), a virtualized RAN network, a long term evolution (LTE)/fourth generation (4G) network, an LTE advanced network, a fifth generation (5G)/new radio (NR) network, or any other next generation network.

The DSS system 200 includes one or more UEs 202a-202n, one or more RANs 204, and a centralized node 206.

The UE(s) (202a-202n) may each be a device capable of supporting at least one of multiple radio access technologies (RATs) (multi-RATs). Examples of the UE (202a-202n) may be, but are not limited to, a mobile phone, a smartphone, a tablet, a phablet, a personal digital assistant (PDA), a laptop, a computer, a wearable computing device, a vehicle infotainment device, an internet of things (IoT) device, a wireless fidelity (Wi-Fi) router, a universal serial bus (USB) dongle, or any other processing devices capable of supporting the at least one RAT. Examples of the RATs may be, but are not limited to, a LTE/4G, an LTE-advanced (LTE-A), a 5G NR, a wireless local area network (WLAN), code division multiple access (CDMA), frequency division multiple access (FDMA), time division multiple access (TDMA), orthogonal frequency division multiple access (OFDMA), general packet radio service (GPRS), enhanced data rates for GSM evolution (EDGE), Universal Mobile Telecommunications System (UMTS), enhanced voice-data optimized (EVDO), high speed packet access (HSPA), HSPA plus (HSPA+), wireless local area network (WLAN), worldwide interoperability for microwave access (WiMAX/IEEE 802.16), Wi-Fi (IEEE 802.11), evolved-UTRA (E-UTRA), Wi-Fi direct, or any other next generation networks.

Each UE (e.g., 202a-202n—reference numerals are used herein for purposes of example and are not intended to be limiting) may connect to at least one RAN 204 for communicating with an external data network. Examples of the external data network include, but are not limited to, the Internet, a packet data network (PDN), an internet protocol (IP) multimedia core network subsystem, and so on. The UE (202a-202n) may connect to the at least one RAN 204 through an air interface.

The RAN 204 may be a multi-RAN module comprising a plurality of radio nodes 204a-204n comprising circuitry. In an example, the RAN 204 may include at least one of, a V-RAN, a C-RAN, and so on. Examples of the radio nodes 204a-204n may be, but are not limited to, base band units (BBUs), distributed units (DUs), eNodeBs, gNodeBs, remote radio units (RRUs), remote radio heads (RRHs), and so on. The radio nodes of the RAN 204 may support the multiple different RATs. In an embodiment herein, the multi-RATs operating in a same frequency band may share a same spectrum between each other with an absence of spectrum re-farming. The multi-RATs may operate as coherent to standard co-existence mechanisms to avoid or reduce interference with each other. The standard co-existence mechanisms include rate matching around reference signals to align subcarrier positioning. Embodiments herein use the terms such as "multiple nodes of the RAN", "multi-RATs", and so on, interchangeably through the document.

Each RAN 204 may be configured to provide the one or more UEs 202a-202n with a wireless broadband access to the external data network, such as when the at least one UE (202a-202n) is present within a coverage area/cell of the RAN 204. The RAN 204 may be connected to the one or more UEs 202a-202n through an air interface for example. The RAN 204 may be connected to the centralized node 206 through a fronthaul link. The fronthaul link may be any communication medium that has an appropriate bandwidth for communication between the centralized node 206 and the at least one RAN 204. Examples of the fronthaul link may be, but are not limited to, a wired communication link, a wireless communication link, a fiber optic cable, an Ethernet, an intranet, the Internet, and so on.

Figure 3:
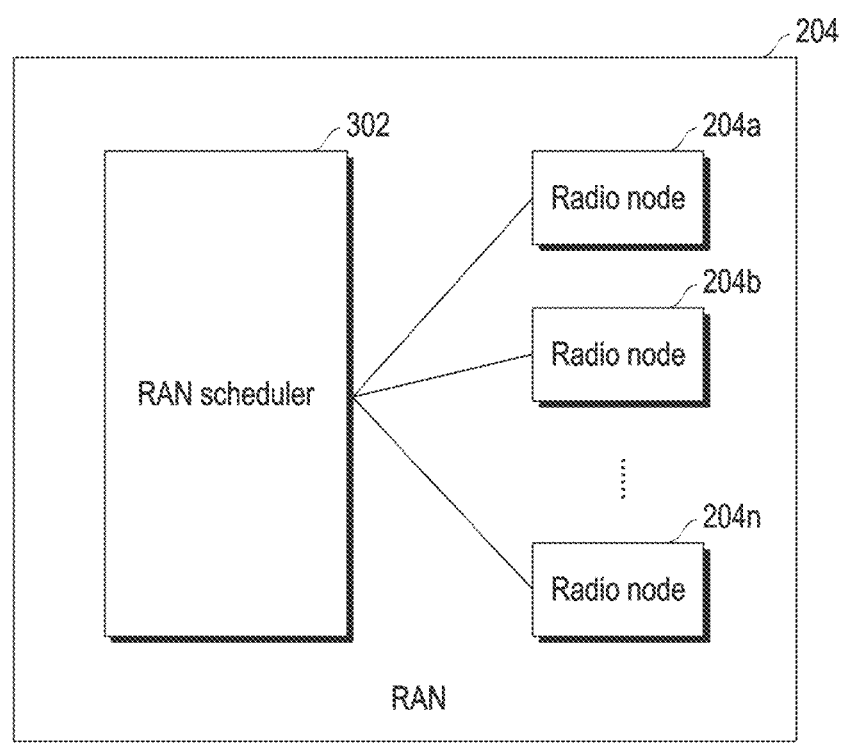
FIG. 3 is a block diagram illustrating an example radio access network (RAN) of the DSS system, according to various example embodiments.

Each RAN 204 may also include a RAN scheduler 302 (also referred as a radio scheduler, or a RAN radio scheduler) (e.g., as depicted in FIG. 3). The RAN scheduler 302 may be configured to monitor key performance indicator (KPI) metrics of the one or more UEs 202a-202n (hereinafter referred as UE KPI metrics/UE metrics) and cell KPI metrics for various scheduling results. The scheduling results refer to results of scheduling radio resources to the one or more UEs 202a-202n for accessing the multi-RATs. Examples of the UE KPI metrics may be, but are not limited to, link adaption, power control metrics, multi-input multi-output (MIMO), signals/system information, throughput metrics, data requirements, channel error metrics, buffer occupancy (BO), throughout (TP), physical resource blocks (PRBs), padding (PAD), radio link failure (RLF), discontinuous reception (DRX), sub carrier spacing (SCS), retransmission (Retx), carrier aggregation (CA), voice over NR (VONR), intermodulation distortion (IMD), and so on. The UE KPI metrics in described in an example table of FIG. 19. Examples of the cell KPI metrics may be, but are not limited to, a throughput, a block error, a total RLF, and so on. The RAN scheduler 302 may allocate air/radio resources to each of the plurality of UEs 202a-202n based on the UE KPI metrics and the cell KPI metrics monitored for one or more previous scheduling results. The RAN scheduler 302 may determine spectral efficiency achieved by the one or more UEs 202a-202n and the cell during the various previous scheduling of radio resources. The RAN scheduler 302 provides the UE KPI metrics, and the cell KPI metrics to the centralized node 206.

The centralized node 206 may include at least one of, but is not limited to, an edge server, a cloud server, an application server, and so on. The centralized node 206 may be remotely located from the at least one RAN 204 and connected to the RAN through the fronthaul link for example. Certain example embodiments herein use the terms such as "centralized node", "edge server", "cloud server", and so on interchangeably to refer to a node connected to the RAN 204 through the fronthaul link.

The centralized node 206 may be configured to determine a DSS policy across the multi-RATs (e.g., 204a-204n). The DSS policy may enable a deployment of the multi-RATs (204a-204n) in a same frequency band, which may reduce inefficiency of usage of a spectrum comparing to spectrum re-framing. The DSS policy may include a DSS pattern and a DSS pattern duration. The DSS pattern provides radio resource sharing information between the multiple RATs 204a-204n. The DSS pattern duration may provide a valid time duration applicable for the DSS policy selected in terms of continuous slots or radio frames for the given DSS pattern. Thus, a unit of the DSS pattern duration may be in terms of slots or in terms of radio frames.

In an example embodiment, the centralized node 206 may determine the DSS policy in a two stage approach. In a first stage, the centralized node 206 may determine a cumulative radio resource requirements of the active UEs 202a-202n (considered for the DSS policy determination) using an individual UE resource scaling factor. The UE resource scaling factor can be used to optimize the size of allocated UE resource blocks (RBs). In a second stage, the centralized node 206 may determine the DSS policy based on the cumulative radio resource requirements of the active UEs 202a-202n, and DSS scaling factors. The DSS scaling factors may include a DSS pattern scaling factor and/or a DSS pattern duration scaling factor. The DSS pattern scaling is a scaling unit to, for example, optimize the ratio of allocated RBs to Multi-RATs. The DSS pattern duration scaling factor is a scaling unit, for example, to optimize the duration in terms of TTIs, of the applied DSS Pattern to Multi-RATs.

For determining the cumulative radio resource requirements of the active UEs 202a-202n, the centralized node 206 may determine a UE resource scaling factor for each of the plurality of UEs 202a-202. The UE resource scaling factor of each UE may be a radio resource scaling factor of the UE (202a-202n).

For determining the UE resource scaling factor for the UE (202a-202n), the centralized node 206 may receive a UE priority list from the RAN scheduler 302 of the RAN 204. The UE priority list depicts the plurality of UEs 202a-202n/ active UEs 202a-202n to be considered in determining the DSS policy, as an example. The RAN scheduler 302 may determine the UE priority list based on the UE KPI metrics and priority policy parameters (such as, but not limited to, mobility, QoS profile, throughput, and so on). Determining of the UE priority list is described in detail in FIG. 8 as an example. The RAN scheduler 302 provides the UE priority list along with non-zero data requirements, previously available UE KPI metrics, and the priority policy parameters used for determining the UE priority list.

On determining the UE priority list, the centralized node 206 enables the RAN scheduler 302 to allocate the air resources to each of the plurality of UEs 202a-202n present in the UE priority list. The centralized node 206 allocates the air resources to each UE (202a-202n) based on the UE KPI metrics and cell KPI metrics monitored for at least one previous scheduling result of scheduling the radio resources.

The centralized node 206 may create a reward matrix ($R_t^k$) for each UE of the active UEs 202a-202n. The reward matrix created for the UE may be referred to as a UE reward matrix. The centralized node 206 may create the UE reward matrix for the UE (202a-202n) by analyzing the UE KPI metrics and the UE priority list using a reinforcement learning (RL) module 502a. Embodiments herein may use the terms such as "RL module", "RL model", "RL based Q-learning module", "Q-learning module/model", and so on, interchangeably through the document. Each such module may comprise circuitry.

The UE reward matrix created for the UE (202a-202n) includes a row index as a UE KPI index (KPI_INDEX$_t^k$) and a column index as a resource block size. The UE KPI index may be an index determined based on the UE KPI metrics monitored in the at least one previous scheduling result. The resource block size may be determined based on the previous resource requirements of the UE (202a-202n).

In an example herein, the UE KPI Index may be determined as:

$$KPI\_INDEX_t^k = Min[f^*(x_t), MAX\_INDEX^{kpi}]$$

wherein, $f^*(x_t)$ may be a function to determine the UE KPI index for the UE (#k) for the last scheduling time t, $x_t$ may be a UE KPI metrics vector/UE metrics vector received from the RAN scheduler 302. If any one of the described metrics is not available for t, a last reported UE KPI metric may be used to determine the UE KPI index. The MAX_INDEX$^{kpi}$ may be a maximum size of the row index of the reward matrix, which may be configurable by a user as:

| KPI_INDEX | | | | |
|---|---|---|---|---|
| $f^*(X_t)=$ | Offset$^{la}$ | Offset$^{pc}$ | Offset$^{sig}$ | Offset$^{cfg}$ |
| | LA Index | TPC Index | Sig Index | Cfg Index |

$$f^*(x_t) = f^{LA}(la_t) \ll OFFSET_t^{la} | f^{PC}(pc_t) \ll OFFSET_t^{PC} | f^{SIG}(sig_t) \ll OFFSET_t^{sig} | f^{CFG}(Cfg_t) \ll OFFSET_t^{cfg} |$$

wherein, $f^{LA}(la_t)$ may be a function that calculates a link adaptation metrics ($la_t$), portion of the UE KPI index (KPI_INDEX$_t^k$) of the UE (202a-202n). OFFSET$_t^{la}$ may be a pre-determined offset width for a link adaptation index portion of the UE KPI index. In an example herein, the $f^{LA}(la_t)$ may be determined as:

$$f^{LA}(la_t) = f^{SNR}(sinr_t) \ll OFFSET_t^{sinr} | f^{MPR}(mpr_t) \ll OFFSET_t^{mpr} | f^{MIMO}(mimo_t) \ll OFFSET_t^{mimo} | f^{OLRC}(olrc_t) \ll OFFSET_t^{olrc} | f^{MCS}(mcs_t) \ll OFFSET_t^{mcs} |$$

wherein, $f^{SNR}(sinr_t)$ may be a function that calculates a signal to interference & noise ratio (SINR) portion of the link adaptation index. Similarly, $f^{MPR}(mpr_t)$ may be for maximum power reduction (MPR) and $f^{OLRC}(olrc_t)$ may be for outer loop rate control (OLRC). Similarly, $f^{PC}(pc_t)$ may be a function that calculates a power control metrics ($pc_t$) portion of the UE KPI index for the UE (202a-202n). OFFSET$_t^{pc}$ may be the pre-determined offset width for a power control index portion of the UE KPI index. In an example herein, the $f^{PC}(pc_t)$ may be determined as:

$$f^{PC}(pc_t) = f^{SNR}(sinr_t) \ll OFFSET_t^{sinr} | f^{TPC}(tpc_t) \ll OFFSET_t^{tpc} | f^{BLER}(bler_t) \ll OFFSET_t^{bler} | f^{PHR}(phr_t) \ll OFFSET_t^{phr} | f^{TA}(ta_t) \ll OFFSET_t^{ta} |$$

wherein $f^{SNR}(sinr_t)$ may be a function that calculates the SINR portion of a power control index. Similarly, $f^{TPC}(tpc_t)$ may be for transmit power command (TPC), and $f^{PHR}(phr_t)$ may be for power headroom report (PHR).

In a similar way, $f^{SIG}(sig_t)$ may be a function that calculates signaling configuration ($sig_t$) potion of the UE KPI Index. In an example herein, the $f^{SIG}(sig_t)$ may be determined as:

$$f^{SIG}(sig_t) = f^{SSB}(ssb_t) \ll OFFSET_t^{ssb} | f^{CRS}(crs_t) \ll OFFSET_t^{crs} | f^{PRS}(prs_t) \ll OFFSET_t^{prs} | f^{TRS}(trs^t) \ll OFFSET_t^{trs} | f^{CSI-RS}(csi-rs_t) ) OFFSET_t^{csi-rs} |$$

Figures 4C, 5:
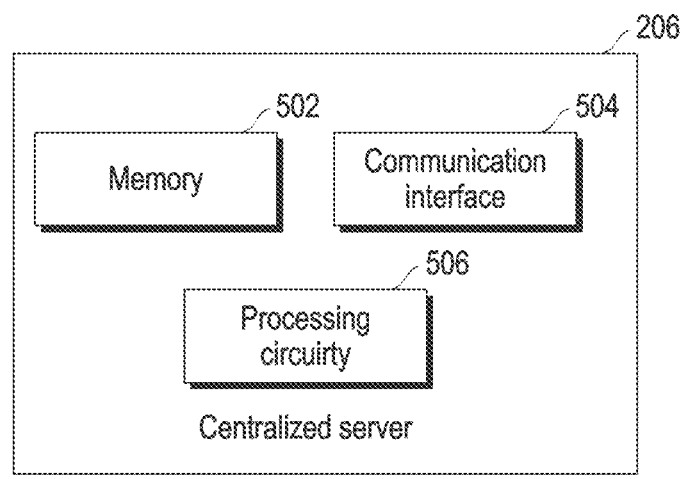
FIG. 4C is a diagram illustrating a pre-defined table for a KPI metric offset width, according to various example embodiments.
FIG. 5 is a block diagram illustrating an example configuration of a centralized node for determining a DSS policy across multiple RATs, according to various example embodiments.

In a similar manner, $f^{CFG}(cfg_t)$ may be a function that calculates a system configuration $cfg_t$ portion of the UE KPI Index. In an example, the $f^{CFG}(cfg_t)$ may be determined as:

$$f^{CFG}(cfg_t) = f^{CA}(ca_t) \ll OFFSET_t^{ca} | f^{DRX}(drx_t) \ll OFFSET_t^{drx} | f^{MG}(mg_t) \ll OFFSET_t^{mg} | f^{VONR}(vonr_t) \ll OFFSET_t^{vonr} | f^{MD}(imd_t) \ll OFFSET_t^{imd} |$$

wherein indexes of individual metrics such as, $f^{SNR}$ ($sinr_t$), $f^{OLRC}$ ($olrc_t$), $f^{MCS}$ ($mcs_t$), $f^{MPR}$ ($mpr_t$) $f^{BLER}$ ($bler_t$) $f^{PHR}$ ($phr_t$), or the like may be mapped to pre-defined range of values provided in example tables of FIGS. 4A, 4B, and 4C. FIG. 4A depicts a pre-defined table for the KPI metric value mapping. FIG. 4B depicts a pre-defined table for modulation and coding scheme (MCS) metric value mapping. FIG. 4C depicts a pre-defined table for a KPI metric offset width.

The centralized node 206 may update the UE reward matrix for each UE (202a-202n) based on spectral efficiency (i.e., performance results) determined for each UE (202a-202n) for each scheduling time. The centralized node 206 may update the UE reward matrix ($R_t^k$) for each UE (202a-202n) as $R_1^k, R_2^k \ldots R_t^k$. At time t=0, $R_0^k$ may not include any spectral efficiency information/data, as no previous scheduling metrics are available.

On creating the UE reward matrix for each UE (202a-202n), the centralized node 206 may determine the spectral efficiency achieved by each UE (202a-202n) (hereinafter referred as UE spectral efficiency) for the at least one previous scheduling result using the UE reward matrix. The UE spectral efficiency achieved by the UE (202a-202n) may be in terms of the performance parameters of the UE (202a-202n) in the at least one previous scheduling result.

The centralized node 206 may generate a UE learning queue by analyzing the UE KPI metrics and the UE spectral efficiency achieved for the at least one previous scheduling result. The centralized node 206 may create the UE learning queue using for example the RL based Q-learning module 502a which may comprise circuitry. The centralized node 206 may feed the UE KPI metrics and the UE spectral efficiency achieved by each UE (202a-202n) for the at least one previous scheduling result to the RL based Q-learning module 502a. The RL based Q-learning module 502a analyzes the UE KPI metrics and the UE spectral efficiency achieved for the at least one previous scheduling result using an epsilon value computed by epsilon greedy method to generate the UE learning queue. In an example, the epsilon value may be computed as:

$$\text{Epsilon value for learning rate}(e^t) = \frac{\text{spectral efficiecny [t] Average Spectral Efficiency [0 ... t-1]}}{\text{Average Spectral Efficiency [0 ... t-1]}}$$

wherein, spectral efficiency[t] may be a current spectral efficiency achieved by the UE (202a-202n) for a UE learning rate updated at t-1, Average Spectral Efficiency [0 . . . . t-1] may be a value of a cumulative historical spectral efficiencies achieved (i.e., a cumulative of the cumulative spectral efficiencies achieved for the previous scheduling results). The spectral efficiency may be mapped to an index value/column index of the UE learning queue.

The UE learning queue includes a row index as the UE KPI metrics and a column index as a UE spectral efficiency index (SEI_INDEX$_t^k$). The UE spectral efficiency index (SEI) may be determined based on the UE spectral efficiency achieved for the at least one previous scheduling result.

In an example herein, the centralized node 206 may determine the UE spectral efficiency index (SEI_INDEX$_t^k$) as:

$$SEI\_INDEX_t^k = \text{Min}[f^{SEI}(sei_t), \text{MAX\_INDEX}_k^{sei}]$$

wherein, $f^{SEI}(sei_t^k)$ may be a function to calculate the SEI index for scheduling time t, wherein the $f^{SEI}(sei_t^k)$ may be determined as:

$$f^{SEI}(sei_t) = f^{TP}(tp_t) \ll \text{OFFSET}_t^{tp} | f^{CRC}(crc_t) \ll \text{OFFSET}_t^{crc} | f^{SF}(sf_t) \ll \text{OFFSET}_t^{sf} |$$

wherein, $f^{TP}(tp_t)$ may be a function to calculate a throughput index value portion of the SEI_INDEX$_t^k$ and OFFSET$_t^{tp}$ may be a pre-determined offset width for the throughput index value portion.

$f^{TP}(tp_t)$ calculates the achieved throughput percentage and the $f^{TP}(tp_t)$ may be determined as:

$$f^{TP}(tp_t) = \frac{tp_t}{\text{MaxThroughput}} \times \frac{100}{t}$$

wherein, $tp_t$ may be the UE throughput achieved for the last/previous scheduling result, and MaxThroughput may be the maximum theoretical throughput possible for a UE configuration. The UE configuration includes maximum supported MCS, MIMO, Bandwidth, Carrier Aggregation, and so on.

wherein, $f^{SF}(sf_t)$ may be a function to determine a scheduling frequency (SF) index value portion of the SEI_INDEX$_t^k$ and OFFSET$_t^{sf}$ may be a pre-determined offset width for the SF index portion. In an example herein, the $f^{SF}(sf_t)$ may be determined as:

$$f^{SF}(sf_t) = \frac{sf_t}{\text{TotalTransmitTimeIntervals}} \times \frac{100}{t}$$

wherein, the $sf_t$ may be a total number of times UE schedule achieved since a last received report and TotalTransmitTimeIntervals may be a total number of possible scheduling by the RAN scheduler.

wherein, $f^{CRC}(crc_t)$ calculates the Rx/Tx error rate percentage of the UE (202a-202n). In an example herein, the $f^{CRC}(crc_t)$ may be determined as:

$$f^{CRC}(crc_t) = \frac{crc_t}{\text{TotalRx and Tx by the UE}} \times \frac{100}{t}$$

Wherein, $crc_t$ may be the total Rx/TX error for the last scheduling result. Similarly, any other metrics such as $f^{TP}(tp_t)$ $f^{CRC}(crc_t)$, $f^{SF}(sf_t)$ may be calculated to fraction points. In such cases, a mapping table like the mapping table depicted in FIG. 4A may be used to map the metrics to the fraction points. Similarly, any other performance metrics described in the above equations may be evaluated to calculate the SEI index.

On generating the UE learning queue, the centralized node 206 uses the RL based Q-learning module 402 which may comprise circuitry to determine a Q-learning rate (at) of each UE (202a-202n) (hereinafter referred as UE learning rate/UE Q-learning rate) for the at least one previous scheduling result based on the generated learning queue. The learning rate indicates accuracy in allocation of efficient resource allocation to individual UEs, which maximizes and/or increases throughput and minimizes and/or reduces errors. In an example, the UE learning rate may be determined as:

Current Learning Rate(4)=Previous Learning Rate($a_{t-1}^k$)+ $e^t$

The centralized node 206 determines the UE resource scaling factor ($\gamma_t^k$) for each UE (202a-202n) corresponding to the at least one previous scheduling result based on at least one of, the UE learning rate of each UE (202a-202n), the previous radio resource requirements of each UE (202a-20n), the UE spectral efficiency achieved by each UE (202a-202n) for the at least one previous scheduling result, and so on.

On determining the UE resource scaling factor, the centralized node 206 may determine radio resource requirements of each UE (202a-202n) using the UE resource scaling factor of each UE.

For determining the radio resource requirements of each UE (202a-202n), the centralized node 206 may create a shared radio resource allocation table/physical resource block (PRB) table ($T_U^{PRB}$) among the plurality of UEs 202a-202n based at least on the UE KPI metrics, the current traffic requirements of each UE (202a-202n), and the individual UE resource scaling factor. The shared radio resource allocation table indicates the total available radio resources per DSS cell, the radio resources allocated for each UE (202a-202n) and remaining available radio resources for allocation among UEs (202a-202n). The centralized node 206 determines the previous radio resource requirements of each UE (202a-202n) from the created shared radio resource allocation table. The previous radio resource requirements of the UE (202a-202n) indicates the radio resource requirements of the UE (202a-202n) for the at least one previous scheduling result. The centralized node 206 determines the radio resources requirements of each UE (202a-202n) by updating the previous radio resource requirements of each UE (202a-202n) using the respective UE resource scaling factor determined based on the UE learning rate. The radio resource recruitments of each UE indicates the radio resources required by the UE (202a-202n) for the multiple RATs. In an example herein, the centralized node 206 uses a constructive heuristic based recursive method to determine the radio resource requirements of each UE (202a-202n) by updating/optimizing the previous radio resource requirements of each UE based on the respective UE resource scaling factor.

After determining the radio resource requirements of each UE, the centralized node 206 may determine the cumulative radio resource requirements of the plurality of UEs 202a-202n based on the radio resource requirements of each UE. In an example, the cumulative radio resource requirements determined for the plurality of UEs 202a-202n supporting an LTE network ($f_t^{PRB}$ ($lte_t$)) may be determined as:

$$f_t^{PRB}(lte_t) = \left| \frac{\sum_{ue=0}^{ue=n} f_{ue}^{PRB}(lte_t)}{\max RBs} \times 100 \right| \text{(Percentage)}$$

wherein, $f_{ue}^{PRB}$ ($lte_t$) may be scaled PRBs of individual UEs using the resource scaling factor.

In another example, the cumulative radio resource requirements determined for the plurality of UEs 202a-202n supporting an NR network ($f_t^{PRB}$ ($nr_t$)) may be determined as:

$$f_t^{PRB}(nr_t) = \left| \frac{\sum_{ue=0}^{ue=n} f_{ue}^{PRB}(nr_t)}{\max RBs} \times 100 \right| \text{(Percentage)}$$

On determining the cumulative radio resource requirements of the plurality of UEs 202a-202n/active UEs, the centralized node 206 determines the DSS policy in the stage 2.

In an example embodiment, determining the DSS policy may refer to determining the DSS pattern ($\varphi_t^{cell}$) and the DSS pattern duration ($\beta_t^{cell}$). The DSS pattern indicates the radio resource sharing information between the multiple RATs. The radio resource sharing information may be either a slot based DSS (S-DSS) policy resource sharing or a frame based DSS (F-DSS) policy resource sharing. The S-DSS policy resource sharing is in a frequency domain of each radio slot and the F-DSS policy resource sharing is in a time domain of a radio frame. The DSS pattern duration indicates the valid time duration applicable for the DSS policy selected in terms of continuous slots or radio frames for the given DSS pattern.

For determining the DSS pattern, the centralized node 206 collects the cell KPI metrics monitored for the at least one previous scheduling result and a current DSS policy from the RAN 204/RAN scheduler 302. Examples of the cell KPI metrics may be, but are not limited to, a throughput, a block error, a total RLF, and so on. The current DSS policy includes a current DSS pattern and a current DSS pattern duration.

The centralized node 206 may create a DSS reward matrix ($R_t^{cell}$) for the at least one previous scheduling result by analyzing the collected cell KPI metrics, and the current DSS policy using the RL based Q-learning module 502a. The DSS reward matrix may include a row index as a cell KPI index (KPI_INDEX$_t^{cell}$) and a column index as a DSS policy index (DSS_INDEX$_t^{cell}$) The cell KPI index may be determined based on the cell KPI metrics. The DSS policy index may be determined based on the current DSS policy. In an example herein, the cell KPI index may be determined as:

$$KPI\_INDEX_t^{cell} = \text{Min}[f^{cell}(x_t), \text{MAX\_INDEX}_{kpi}^{cell}]$$

wherein, $f^{cell}(x_t)$ may be a function to determine the KPI index of the DSS reward matrix for a last scheduling instance t, $x_t$ may be a cell KPI metric vector received from the RAN scheduler. If any of the cell KPI metrics is not available for the last scheduling instance t, a last reported cell KPI metric may be used. In an example, the $f^{cell}(x_t)$ may be determined as:

$$f^{cell}(x_t) = |f_{TP}^{cell}(tp_t) - f_{CRC}^{cell}(crc_t^{cell}) - f_{INT}^{cell}(int_t) - f_{RLF}^{cell}(rlf_t) - \ldots \text{ any other performance metrics}|$$

wherein, $f^{cell}(x_t)$ may be calculated to fraction points. In such cases, a mapping table similar to the mapping table depicted in FIG. 4A may be used to calculate the fraction points for the $f^{cell}(x_t)$.

wherein, $f_{TP}^{cell}(tp_t)$ calculates the last achieved throughput percentage. In an example herein, the $f_{TP}^{cell}(tp_t)$ may be calculated as:

$$f_{TP}^{cell}(tp_t) = \frac{tp_t}{\text{MaxThroughput}} \times 100$$

wherein, $tp_t$ may be a cell throughput achieved for the last/previous scheduling result and MaxThroughput may be the maximum theoretical throughput possible for the cell configuration.

wherein, $f_{CRC}^{cell}$ ($crc_t^{cell}$) calculates a total block error (BLER) percentage of the cell. In an example herein, the $f_{CRC}^{cell}$ ($crc_t^{cell}$) may be determined as:

$$f_{CRC}^{cell}(crc_t^{cell}) = \frac{crc_t^{cell}}{TotalScheduledUEs} \times 100$$

wherein, $crc_t^{cell}$ may be a cumulative BLER for all the UEs (202a-202n) for the last scheduling result and TotalScheduledUEs may be the total number of active UEs allocated radio resources in the last scheduling result.

Similarly, a total interference percentage $f_{INT}^{cell}$ ($int_t$), a total RLF $f_{RLF}^{cell}$($rlf_t$), or the like may be calculated for the last scheduling instance t. An inference of the UE (202a-202n) may be measured in terms of dBm from an intracell or an intercell. The interference may be indicated by parameters such as, but are not limited to, SINR, a channel quality indicator (CQI), and so on. The RLF may be a RLF state, wherein the UE (202a-202n) lost a connection with the RAN 204, due to its weak signal conditions. In such cases, the UE (202a-202n) has to re-establish the signalling connection with the RAN 204.

On creating the DSS reward matrix, the centralized node 206 may determine spectral efficiency achieved by the cell (hereinafter referred as cell spectral efficiency) for the at least one previous scheduling result based on the created DSS reward matrix. The cell spectral efficiency achieved for the at least one previous scheduling result may indicate the spectral efficiency achieved with respect to the cell KPI metrics for the at least one previous scheduling result.

The centralized node 206 may generate a cell learning queue ($Q^{cell}$) for the at least one previous scheduling result by analyzing the cell spectral efficiency achieved with respect to the cell KPI metrics for the at least one previous scheduling result using the RL based Q-learning module 502a. The cell learning queue includes a row index as the cell KPI index (KPI_INDEX$_t^{cell}$) and a column index as a spectral efficiency index for the cell (referred hereinafter as a cell spectral efficiency index (cell SEI index)) (SEI_INDEX$_t^{cell}$). The spectral efficiency index may be calculated based on the cell spectral efficiency achieved for the at least one previous scheduling result. In an example herein, the cell SEI index may be determined as:

SEI_INDEXtcell=Min[f$^{SEI}$(seiCell),MAX_INDEX-cel]

wherein, $f^{SEI}$ (sei$_t^{cell}$) may be a function to calculate the cell SEI index for the scheduling time t. In an example herein, the $f^{SEI}$ (sei$_t^{cell}$) may be determined as:

$$f^{SEI}(sei_t^{cell}) = \left| \frac{\left(\sum_0^t f^{cell}(x_t)\right)}{t} \right|$$

wherein, $f^{SEI}$(sei$_t^{cell}$) may be a percentage value of the cell KPI metrics received from the RAN scheduler for the scheduling time t. It is noted that $f^{SEI}$ (sei$_t^{cell}$) may be calculated to the fraction points. In such cases, a mapping table similar to the mapping table depicted in FIG. 4A to calculate the $f^{SEI}$ (sei$_t^{cell}$) to the fraction points.

On creating the cell learning queue, the centralized node 206 may determine a cell learning rate for the at least one previous scheduling result from the generated cell learning queue. The cell learning rate indicates the accuracy in allocation of efficient resource allocation multi-RATs, which maximizes throughput and minimizes and/or reduces errors.

On determining the cell learning rate, the centralized node 206 may create a DSS pattern scaling factor table ($T_P^{DSS}$) based on at least one of a previously applied DSS pattern, the cell spectral efficiency achieved for the at least one previous scheduling result, a status of each of the plurality of UEs 202a-202n, the cell learning rate, and so on. In an example, the status of the UE (202a-202n) may include at least one of a total number of active UEs, cell edge UEs, handover UEs, and so on.

In an example, the status of the UE (202a-202n) may be represented as:

$$f^{cell}(y_t) = \left| f_{UE}^{cell}(ue_t) - \frac{f_{EDE}^{cell}(edg_t)}{f_{UE}^{cell}(ue_t)} \times Edge_{factor}^{cell} \times 100 - \frac{f_{HO}^{cell}(ho_t)}{f_{UE}^{celll}(ue_t)} \times 100 \ldots \text{any other UE status metrics} \right|$$

wherein, $f^{cell}(y_t)$ may be a UE status factor on absolute scale, $f_{UE}^{cell}(ue_t)$ may be a total number of last scheduled UEs by the RAN scheduler, $f_{EDE}^{cell}(edg_t)$ may be a total number of cell edge UEs out of the last scheduled UEs $f_{UE}^{cell}(ue_t)$ by the RAN scheduler. Criteria for the cell edge UEs may depend upon a signal quality threshold configuration, which may be a tuneable parameter from higher layers. Edge$_{factor}^{cell}$ is a discount factor for the cell edge UEs, out of last the scheduled UEs, and $f_{HO}^{cell}$ (hot) may be the total number of UEs met handover threshold criteria set by the cell, out of the last scheduled UEs.

The DSS pattern scaling factor table may include a row index as a DSS pattern index and a column index as the cell learning rate. The DSS pattern index may be determined based on the previously applied DSS pattern. In an example herein, the DSS pattern index may be mapped to the row index 1:1.

The centralized node 206 may determine a DSS pattern scaling factor ($\varphi_t^{cell}$) for the at least one previous scheduling result based on the created DSS pattern scaling factor table. The DSS pattern scaling factor is one of the pluralities of DSS scaling factors. The centralized node 206 may use the constructive heuristic based recursive method to update/optimize the DSS pattern scaling factor determined for the at least one previous scheduling result based on the previously applied DSS pattern, the status of each of the plurality of UEs, the cell learning rate, and cell performance parameters. The centralized node 206 stores the updated DSS patter scaling factor in the DSS scaling factor table.

The centralized node 206 determines the DSS pattern by scaling the current DSS pattern using at least one of the updated DSS pattern scaling factor, the cumulative radio resource requirements of the plurality of UEs, and a UE resource requirement ratio. The UE resource requirement ratio indicates a ratio of the radio resources required by the UE for the multiple RATs 204a-204n. The centralized node 206 stores the DSS pattern in a DSS pattern table. The DSS pattern table indicates various DSS patterns, wherein each DSS pattern may be indicated by a pattern index.

For determining the DSS pattern duration, the centralized node 206 may create a DSS pattern duration scaling factor table for the at least one previous scheduling result based on a previously applied DSS pattern duration, and the cell learning rate. The DSS pattern duration scaling factor table may include a row index as a DSS duration index and a column index as the cell learning rate. The DSS duration index may be determined based on the previously applied DSS patter duration. The centralized node 206 updates the DSS pattern duration scaling factor determined for the at least one previous scheduling result based on at least one of, the cell learning rate, the cell spectral efficiency, the status of each of the plurality of UEs, and the scaled DSS pattern. The centralized node 206 then determines the DSS pattern duration by scaling the current DSS pattern duration using the updated DSS pattern duration scaling factor.

The centralized node 206 may also be configured to determine the DSS policy by following RAT scheduling coordination and restriction. The RAT scheduling coordination and restriction includes at least one of, shared resource coordination, interference avoidance or reduction, and communicating radio metrics between the multiple RATs with an absence of a direct interface.

FIG. 5 is an example block diagram depicting various components of the centralized node 206 for determining the DSS policy across the multiple RATs, according to certain example embodiments. The centralized node 206 may include a memory 502, a communication interface 504, and/or a processing circuitry 506. The centralized node 206 may also include a radio frequency (RF) transceiver, a signal processing circuitry, an Input/Output ports, a display, and so on (not shown).

The memory 502 may include at least one of, but is not limited to, NAND, embedded multimedia card (eMMC), secure digital (SD) cards, universal serial bus (USB), serial advanced technology attachment (SATA), solid-state drive (SSD), and so on. Further, the memory 502 may include one or more computer-readable storage media. The memory 502 may include one or more non-volatile storage elements. Examples of such non-volatile storage elements may include random access memory (RAM), read only memory (ROM), magnetic hard discs, optical discs, floppy discs, flash memories, or forms of electrically programmable memories (EPROM) or electrically erasable and programmable (EEPROM) memories. In addition, the memory 502 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that may, over time, change (e.g., in RAM or cache).

The memory 502 stores at least one of, the UE resource scaling factor, the cumulative radio resource requirements of the plurality of UEs 202a-202n, the UE KPI metrics, the cell KPI metrics, the UE priority list, the UE reward matrix of each UE (202a-202n), the learning queue, the UE Q-learning rate, the shared radio resource allocation table, the previous radio resource requirements of each UE (202a-202n), the DSS policy including the DSS pattern and the DSS pattern duration, the DSS reward matrix, the cell/UE spectral efficiency achieved for the at least one previous scheduling result, the cell learning rate, the DSS pattern scaling factor table, the DSS pattern table, the DSS pattern duration scaling factor table, the DSS pattern duration scaling factor, and so on.

The memory 502 may also store the RL module/the RL based Q-learning module 502a. The RL based Q-learning module 502a may include and/or be executed by the processing circuitry 406 to create the UE reward matrix for the UE (202a-202n), and the DSS reward matrix and to determine the UE learning rate and the cell learning rate. In an example embodiment, the UE learning rate and the cell learning may be collectively referred to as a learning rate.

Examples of the RL based Q-learning module 502a may be, but are not limited to, an artificial intelligence (AI) model, a multi-class support vector machine (SVM) model, a convolutional neural network (CNN) model, a deep neural network (DNN), a recurrent neural network (RNN), a restricted boltzmann machine (RBM), a deep belief network (DBN), a bidirectional recurrent deep neural network (BRDNN), generative adversarial networks (GAN), a regression based neural network, a deep reinforcement model (with ReLU activation), a deep Q-network, and so on, and each may include circuitry. The RL based Q-learning module 502a may include a plurality of nodes, which may be arranged in layers. Examples of the layers may be, but are not limited to, a convolutional layer, an activation layer, an average pool layer, a max pool layer, a concatenated layer, a dropout layer, a fully connected layer, a SoftMax layer, and so on. Each layer has a plurality of weight values and performs a layer operation through calculation of a previous layer and an operation of a plurality of weights/coefficients. A topology of the layers of the RL based Q-learning module 502a may vary based on the type of the respective network.

In an example, the RL based Q-learning module 502a may include an input layer, an output layer, and a hidden layer. The input layer receives a layer input and forwards the received layer input to the hidden layer. The hidden layer transforms the layer input received from the input layer into a representation, which may be used for generating the output in the output layer. The hidden layers extract useful/low level features from the input, introduce non-linearity in the network and reduce a feature dimension to make the features equivalent to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

The RL based Q-learning module 502a may be trained using at least one learning method. Examples of the learning method may be, but are not limited to, supervised learning, unsupervised learning, semi-supervised learning, reinforcement learning, regression-based learning, and so on. The trained RL based Q-learning module 502a may be a neural network model in which a number of layers, a sequence for processing the layers and parameters related to each layer may be known and fixed for performing the intended functions. Examples of the parameters related to each layer may be, but are not limited to, activation functions, biases, input weights, output weights, and so on, related to the layers. A function associated with the learning method may be performed through the non-volatile memory, the volatile memory, and the processing circuitry 406. The processing circuitry 406 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

Here, being provided through learning that, by applying the learning method to a plurality of learning data, a predefined operating rule or the RL based Q-learning module (e.g., 502a) of a desired characteristic is made. Functions of the RL based Q-learning module 502a may be performed in the centralized node 206 itself in which the learning according to an embodiment is performed, and/or may be implemented through a separate server/system.

The communication interface 504 may be configured to enable the centralized node 206 to communicate with the UEs 202a-202n, and the RAN 204a-204n using an interface. Examples of the interface may be, but are not limited to, a wired interface, a wireless interface, or any structure supporting communications over a wired or wireless connection.

The term processing circuitry 506 as used herein, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a system-on-chip (SoC), a programmable logic unit, a microprocessor, application-specific integrated circuit (ASIC), etc. For example, the processing circuitry 506 may include at least one of, a single processer, a plurality of processors, multiple homogeneous or heterogeneous cores, multiple CPUs of different kinds, microcontrollers, special media, and other accelerators.

The processing circuitry 506 may be configured to determine the DSS policy across the multiple RATs. For determining the DSS policy, the processing circuitry 506 determines the UE resource scaling factor for each of the plurality of UEs 202a-202n. The processing circuitry 506 determines the radio resource requirements of each of the plurality of UEs 202a-202n using the UE resource scaling factor of each UE (202a-202n). The processing circuitry 506 determines the cumulative radio resource requirements of the plurality of UEs 202a-202n based on the radio resource requirements of each UE 202a-202n. The processing circuitry 506 determines the DSS policy for scheduling the radio resources based on the cumulative radio resource requirements of the plurality of UEs, the cell KPI metrics, and the plurality of DSS scaling factors.

Figure 6:
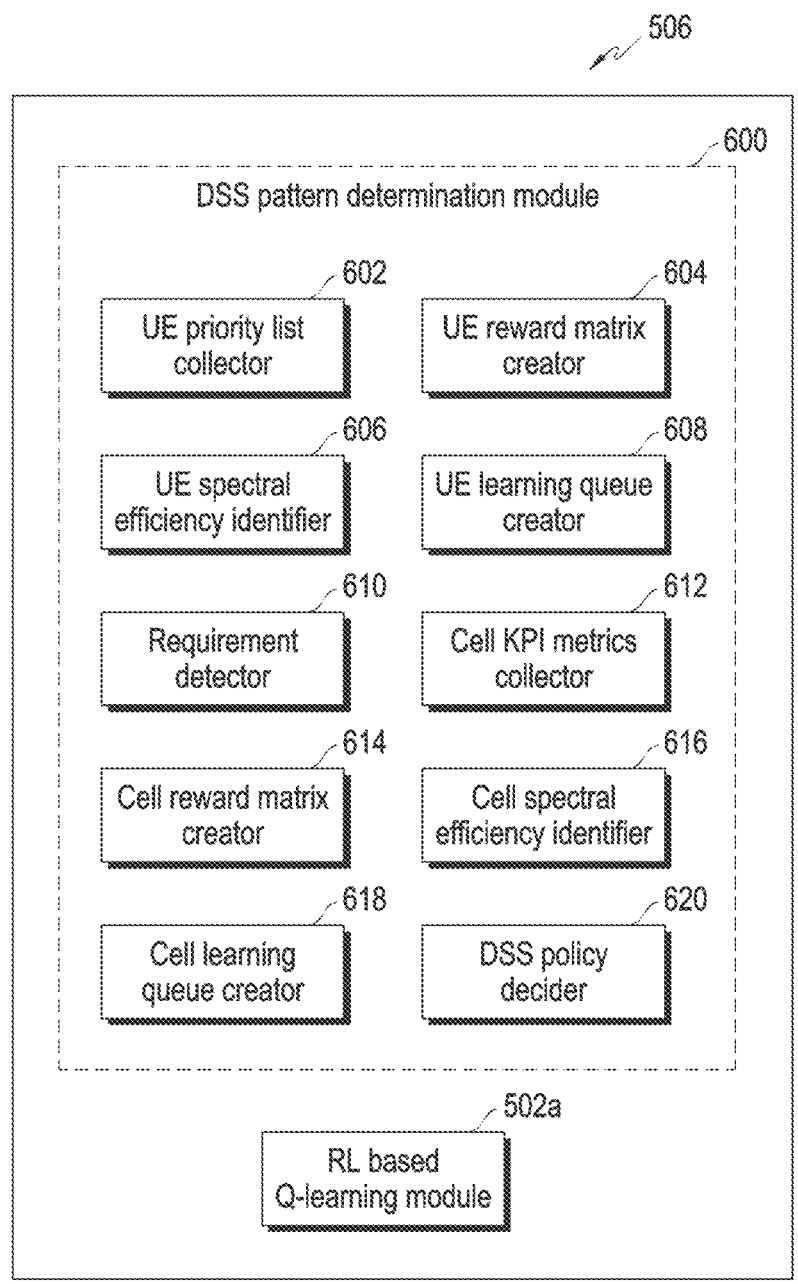
FIG. 6 is a block diagram illustrating an example configuration of DSS pattern determination module performance in the centralized node to determine the DSS policy, according to various example embodiments.

The processing circuitry 506 may execute a DSS pattern determination module 600 to determine the DSS policy, as depicted in FIG. 6. FIG. 6 depicts the DSS pattern determination module 600 performance in the centralized node 206 to determine the DSS policy, according to embodiments as disclosed herein.

The DSS pattern determination module 600 (which may comprise circuitry) may include a UE priority list collector 602, a UE reward matrix creator 604, a UE spectral efficiency identifier 606, a UE learning queue creator 608, a requirement detector 610, a cell KPI metrics collector 612, a cell reward matrix creator 614, a cell spectral efficiency identifier 616, a cell learning queue creator 618, and a DSS policy decider/DSS coordinator 620. The UE priority list collector 602, the UE reward matrix creator 604, the UE spectral efficiency identifier 606, the UE learning queue creator 608, and the requirement detector 610 may be operated in the first stage to determine the cumulative radio resource requirements of the active UEs 202a-202n. Determining the cumulative radio resource requirements of the active UEs 202a-202n using such elements of the DSS policy determination module 600 is described in detail in conjunction with FIG. 7. The cell KPI metrics collector 612, the cell reward matrix creator 614, the cell spectral efficiency identifier 616, the cell learning queue creator 618, and the DSS policy decider 620 may be operated in the second stage to determine the DSS policy. Determining the DSS policy is described in detail in conjunction with FIG. 9.

Figure 7:
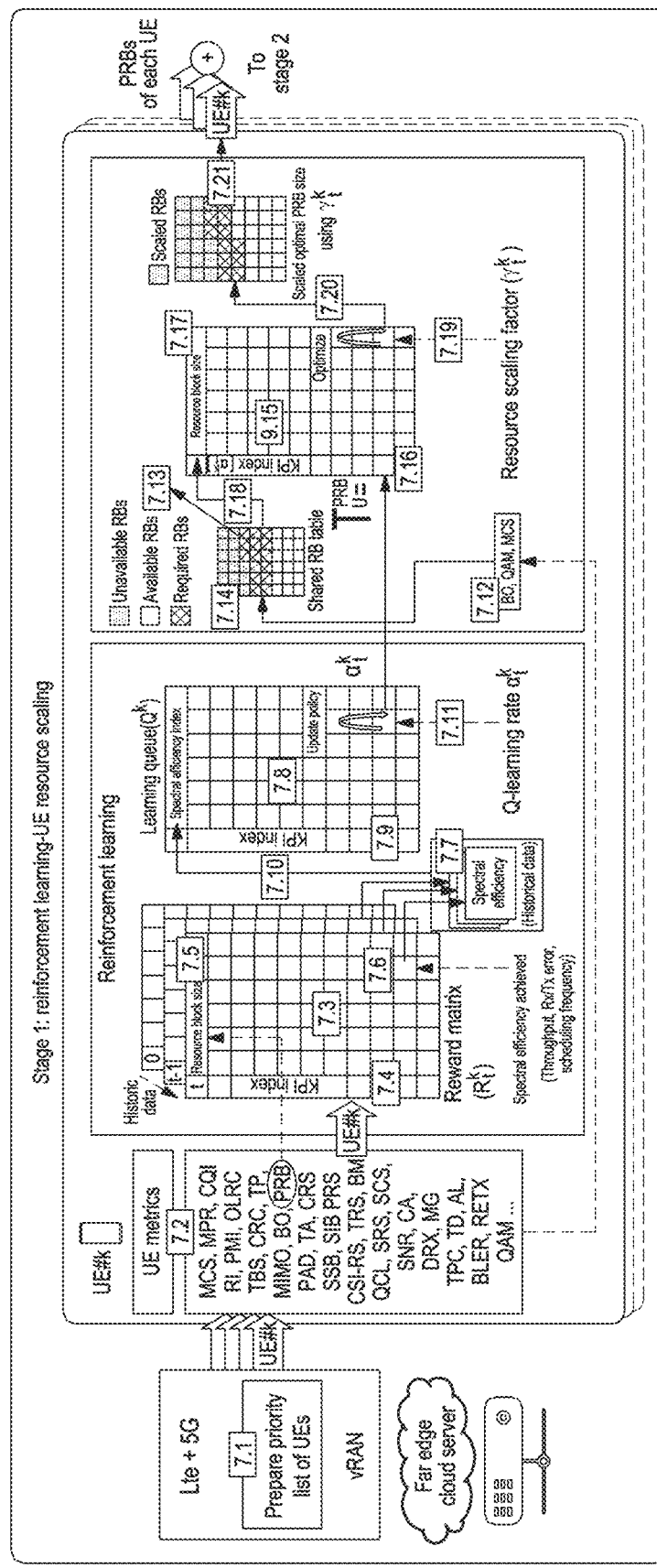
FIG. 7 is a diagram illustrating an example architecture of the DSS policy determination module for determining radio resource requirements of each user equipment (UE) of active UEs, according to various example embodiments.

FIG. 7 depicts an example architecture of the DSS policy determination module 600 for determining the radio resource requirements of each UE of the active UEs 202a-202n, according to embodiments as disclosed herein.

Figure 8:
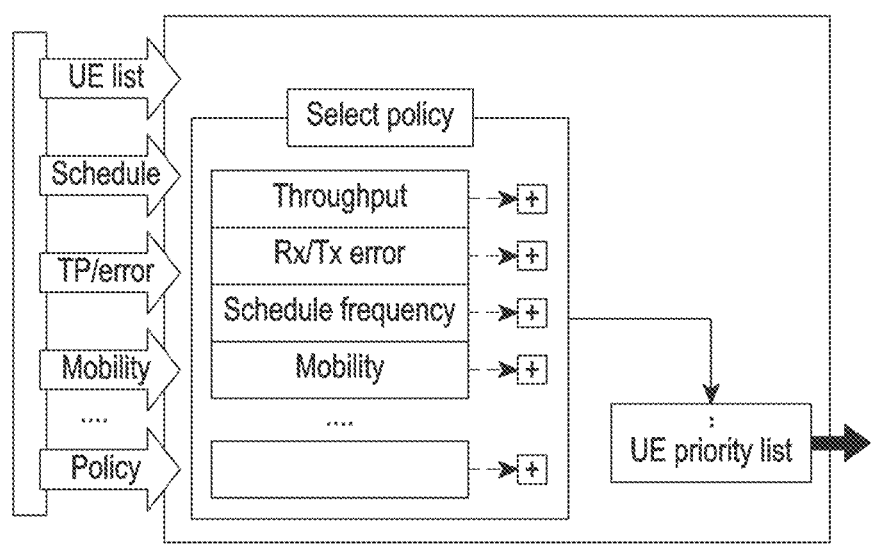
FIG. 8 is a diagram illustrating an example determination of a UE priority list, according to various example embodiments.

The UE priority list collector 602 (at step 7.1) may be configured to receive the UE priority list from the RAN 204. The UE priority list provides information about the active UEs 202a-202n that have to be considering while determining the DSS policy. Determining the UE priority list at the RAN 204 is depicted in FIG. 8. As depicted in FIG. 8, the RAN scheduler 302 of the RAN 204 determines the UE priority list. The RAN scheduler 302 collects the UE KPI metrics of the UEs 202a-202n and selects policy parameters from the UE KPI metrics. The RAN scheduler 302 determines the UE priority list based on the UE KPI metrics and the policy parameters/priority policy parameters. The RAN scheduler 302 provides the UE priority list along with the non-zero data requirements, last available UE KPI metrics, OAM information (load balancing information, or the like), the policy parameters used to determine the UE priority list, or the like to the UE priority list collector 602. The RAN scheduler 302 at the RAN 204 (at step 7.2) may also be configured to allocate the air resources to the individual active UEs according to scheduling methods based on the various UE and cell KPI metrics with reference to the previous scheduling results.

The UE reward matrix creator 604 (at step 7.3) may be configured to create the UE reward matrix for each UE of the active UEs 202a-202n. The UE reward matrix may include the spectral efficiency achieved for the UE (202a-202n) for the previous scheduling result (which has been scheduled by the RAN scheduler 302). The UE reward matrix creator 604 updates the UE reward matrix each time when the spectral efficiency achieved for the various scheduling results is available. The UE reward matrix may include the row index as the KPI index and the column index as the resource block size. The KPI index may be calculated (at step 7.4) based on the UE KPI metrics received from the RAN 204 for the previous scheduling result. The resource block size may be determined (at step 7.5) based on the previous resource requirements of the UE (202a-202n). The resource block size may be mapped 1:1 to the column index of the UE reward matrix, as maximum PRBs supported in an example NR system is 273RB.

The UE spectral efficiency identifier 606 (at steps 7.6/7.7) may be configured to determine the spectral efficiency achieved by the UE (202a-202n) for the previous scheduling result. The spectral efficiency achieved by the UE (202a-202n) may indicate performance/service results received from the RAN 204 for the previous scheduling result.

The UE learning queue creator 608 (at step 7.8/7.11) may be configured to create the learning queue by analyzing the UE KPI metrics and the UE spectral efficiency achieved for the at least one previous scheduling result. The UE learning queue adopts an off-policy method that asymptotically converges to the optimal UE learning rate based on a given sufficient exploration on the historical spectral efficiency achieved for the various scheduling results (metrics) for the UE (202a-202n). The UE learning queue includes the row index as the UE KPI index and the column index as the spectral efficiency index. The UE KPI index may be determined (at step 7.9) similar to step 7.4. The spectral efficiency index may be determined (at step 7.10) based on the historical spectral efficiency achieved by the UE (202a-202n) for the given scheduling result. Also, various components of the spectral efficiency (for example, the UE throughput, the Tx/Rx errors, the UE scheduling frequency, or the like) may be used in forming a unique index, which describes the spectral efficiency.

The UE learning queue creator 608 may use the RL based Q-learning module 502a to derive the UE learning rate for the previous scheduling result based on the learning queue.

The requirement detector 610 (e.g., at step 7.12/7.13/7.14) may be configured to determine the radio resource requirements/PRBs of the UE (202a-202n). For determining the radio resource requirements of the UE (202a-202n), the requirement detector 610 may create the shared radio resource allocation table among the plurality of UEs 202a-202n based on the UE KPI metrics, the UE metrics vector (buffer occupancy (BO), MCS, quadrature amplitude modulation (QAM), or the like), the current traffic requirements of the UE, and the individual UE resource scaling factor. The shared radio resource allocation table is depicted as 7.15 in FIG. 7. The shared radio resource allocation table stores the optimized UE resource scaling factor for the UE (202a-202n) for the derived UE learning rate. The UE resource scaling factor for the previous scheduling result received from the RAN 204 may be optimized and stored in the shared radio resource allocation table for a vector pair (Index (at), PRB index).

The requirement detector 610 may initially estimate the radio resource requirements/PRBs of the UE (202a-202n) using the optimized UE resource scaling factor. The PRBs of the UE (202a-202n) may be resized/scaled to the optimal PRB size using the UE metrics vector. The above described steps may be repeated for determining the radio resource requirements/PRBs of all the active UEs 202a-202n.

The radio resource requirements of each UE (202a-202n) may be used to determine the cumulative radio resource requirements of all the active UEs 202a-202n.

Figure 9:
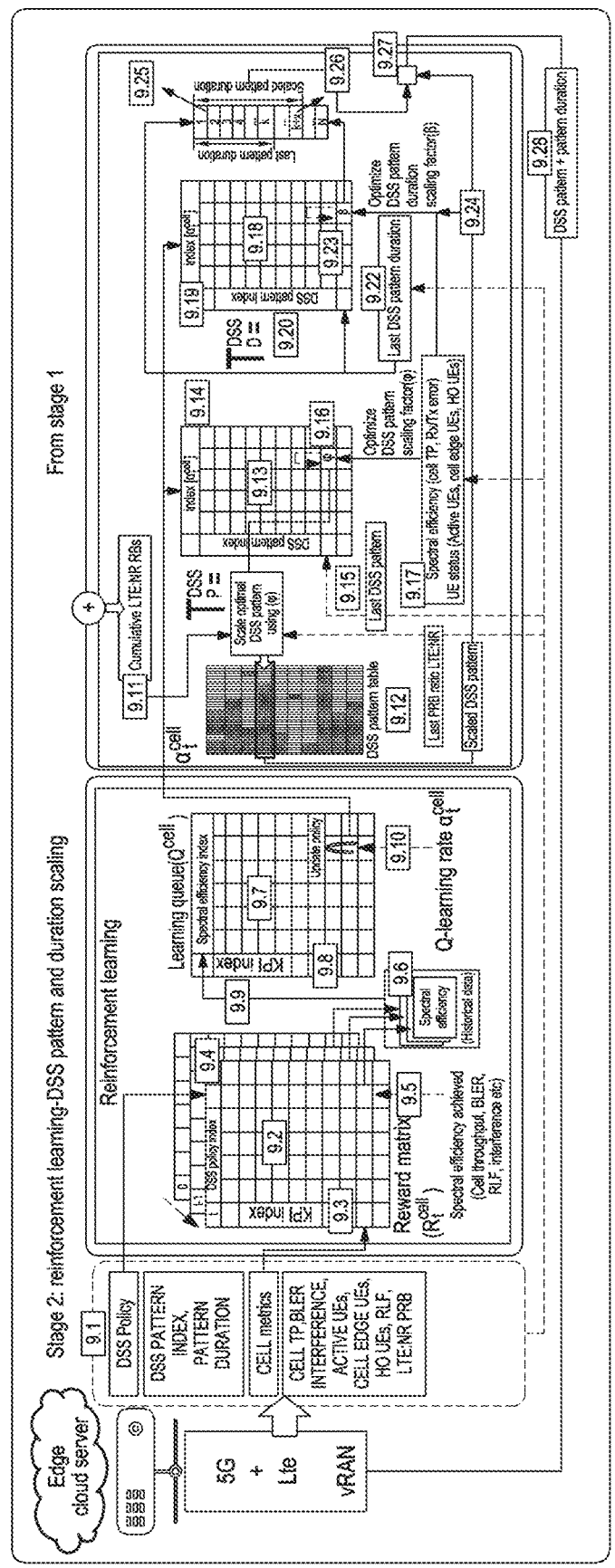
FIG. 9 is a diagram illustrating an example architecture of the DSS policy determination module for determining the DSS policy, according to various example embodiments.

FIG. 9 depicts an example architecture of the DSS policy determination module 600 for determining the DSS policy, according to certain example embodiments as disclosed herein.

The cell KPI metrics collector 612 (at step 9.1) may be configured to collect the cell KPI metrics from the RAN scheduler 302 of the RAN 204. The cell KPI comprises of L1/L2 layer metrics used for scheduling, resource allocation, the total BO, downlink/uplink (DL/UL) throughput, BLER, total retransmissions, interference, total RLF, the cell edge and handover UE, or any other similar metrics.

The cell reward matrix creator 614 (at step 9.2) may be configured to create the cell reward matrix. The cell reward matrix includes the cell spectral efficiency achieved for all the active UEs 202a-202n during the previous scheduling result. The historical cell spectral efficiency achieved for the various scheduling results may be updated to the cell reward matrix each scheduling time. The cell reward matrix includes the row index as the cell KPI index and the column index as the DSS policy index. The cell KPI index may be determined (at step 9.3) based on the cell KPI metrics. The DSS policy index may be determined (at step 9.4) based on the current DSS policy.

The cell spectral efficiency identifier 616 (at step 9.5) may be configured to determine the cell spectral efficiency achieved by the cell for the previous scheduling result. The cell spectral efficiency may be expressed in terms of the cell throughput, the Tx/Rx errors, and so on.

The cell learning queue 618 (at step 9.7) may be configured to create the cell learning queue for the at least one previous scheduling result by analyzing the cell spectral efficiency achieved with respect to the cell KPI metrics for the at least one previous scheduling result using the RL based Q-learning module 502a. The cell learning queue stores the cell learning rate for the historical scheduling results. The cell learning adopts an off-policy method that asymptotically converges to the optimal learning rate, based on the given sufficient exploration on the historical spectral efficiency achieved for the various scheduling results for the UE (202a-202n). The cell learning queue includes the row index as the cell KPI index (determined at step 9.8) and the column index as the spectral efficiency index calculated (at step 9.9) based on the cell spectral efficiency achieved for the at least one previous scheduling result The DSS policy decider 620 may be configured to determine the DSS policy including the DSS pattern and the DSS pattern duration time. For determining the DSS policy, the DSS policy decider 620 (at step 9.11), receives the cumulative radio resources/PRBs of all the active UEs 202a-202n using the individual UE resource scaling factor from the requirement detector 610. Alternatively, the DSS policy decider 620 determines the cumulative radio resources/ PRBs of all the active UEs 202a-202n using the individual UE resource scaling factor received from the requirement detector 610.

The DSS policy decider 620 (at step 9.12) may create the DSS pattern scaling factor table based on at least one of, the previously applied DSS pattern, the cell spectral efficiency achieved for the at least one previous scheduling result, the status of each of the plurality of UEs, and the cell learning rate. The DSS pattern scaling factor table indicates the radio resource sharing plan across the multi-RAT either per radio slot or per radio frame. For the greater flexibility, a larger number of DSS patterns may be defined. Each DSS pattern in the DSS pattern scaling factor table may be identified by a pattern index. The DSS policy decider 620 (at step 9.13) determines the DSS pattern scaling factor for the at least one previous scheduling result based on the created DSS pattern scaling factor table.

The DSS pattern scaling factor table stores (at step 9.16) the optimized DSS pattern scaling factor for the row index and the column index pair determined at step 9.14/9.15.

The DSS policy decider 620 may derive the DSS pattern scaling factor for the derived cell learning rate based on the DSS pattern scaling factor table. The DSS pattern scaling factor table may include the row index determined based on the previously applied DSS pattern and the column index determined based on the cell learning rate. The column index (9.14 in FIG. 9) of the DSS pattern scaling factor table may be mapped using the cell learning rate. The row index (9.15) of the DSS pattern scaling factor table may be mapped using the DSS pattern applied during the previous scheduling result. The DSS pattern index/column index may be directly mapped to the row index 1:1.

The DSS policy decider 620 may determine the DSS pattern by scaling the current DSS pattern using at least one of the updated DSS pattern scaling factor, the cumulative radio resource requirements of the plurality of UEs, and the UE resource requirement ratio. The DSS policy decider 620 may store the determined DSS pattern in the DSS pattern table.

The DSS policy decider 620 (e.g., at step 9.18) may create the DSS pattern duration scaling factor table for the at least one previous scheduling result based on the previously applied DSS pattern duration, and the cell learning rate. The DSS pattern duration scaling factor table may include the row index (9.19) determined based on the previously applied DSS pattern duration, and the column index (9.20) determined based on the cell learning rate. The column index/ DSS pattern duration index may be directly mapped to the row index 1:1.

The DSS policy decider 620 may determine the DSS pattern duration scaling factor from the DSS pattern duration scaling factor table for the at least one previous scheduling result. The DSS policy decider 620 may update the DSS pattern duration scaling factor determined for the at least one previous scheduling result based on at least one of the cell learning rate, the cell spectral efficiency, the status of each of the plurality of UEs, and the scaled DSS pattern. The DSS policy decider 620 may determine the DSS pattern duration by scaling the current DSS pattern duration using the updated DSS pattern duration scaling factor.

The last applied DSS pattern duration, the scaled DSS pattern duration using the DSS pattern duration scaling factor, the interface to the RAN 204 to share the updated DSS pattern and the DSS pattern duration are depicted for example as 9.25, 9.26, and 9.7.

Figure 10:
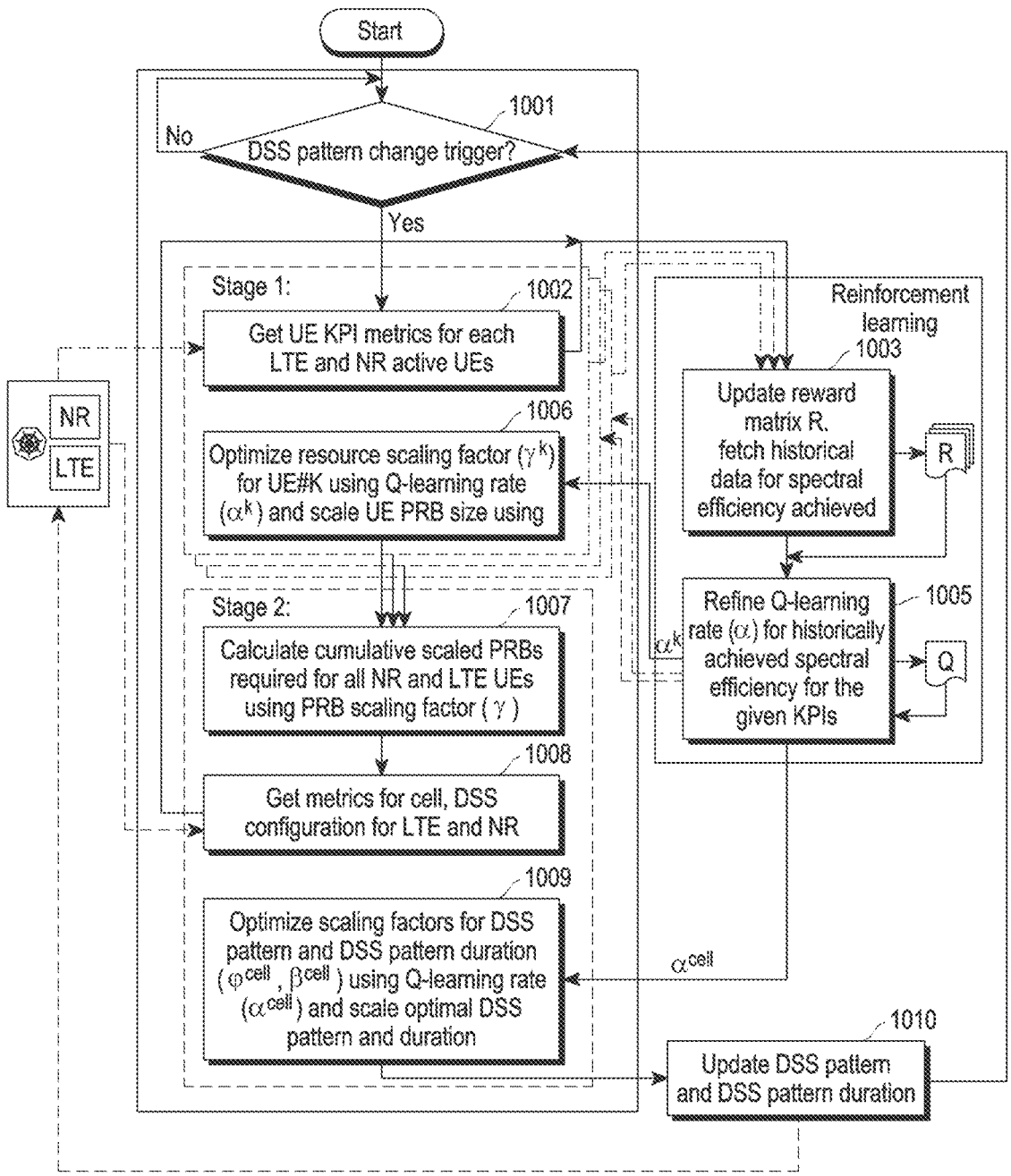
FIG. 10 is a flowchart illustrating an example method for determining the DSS policy across the multiple RATs, according to various example embodiments.

FIG. 10 is an example flow diagram depicting a method for determining the DSS policy across the multiple RATs, according to certain example embodiments as disclosed herein.

At step 1001, the centralized node 206 may decide if an event to trigger next DSS pattern and DSS pattern duration change is met. In an example, the event may include a DSS pattern duration timer expiry, a traffic change event, or the like. The event may be configured by higher layers using suitable existing methods.

At step 1002 in FIG. 10, once the event to trigger the next DSS pattern and DSS pattern duration change is met, the centralized node 206 collects the historical UE/cell KPI metrics from the RAN 204 (for example including the LTE and NR RATs/radio nodes (204a-204n)). The UE KPI metrics may include various scheduling parameters used by the RAN scheduler 302 as well as the spectral efficiency achieved by the UE (202a-202n) for the previous scheduling results. The spectral efficiency may be measured in terms of the achieved throughput, the Rx/Tx error, the scheduling frequency, or any other performance metric. The centralized node 206 processes the UE/cell KPI metrics using the RL based Q-learning module 502a to derive the optimized learning rate for the achieved spectral efficiency for the given UE KPI metrics.

At step 1003-1005 in FIG. 10, the RL based Q-learning module 502a contains the UE reward matrix R for each UE (202a-202n), which stores the historical spectral efficiency achieved for the various scheduling results for each UE (202a-202n). The historical spectral efficiency achieved for the various scheduling results and the UE KPI metrics may be used by the RL based Q-learning module 502a to derive the optimal UE learning rate for each UE (202a-202n). The RL based Q-learning module 502a uses the off-policy method such as, the Q-learning agent that asymptotically converges to the optimal learning rate based on given sufficient exploration on the historical spectral efficiency achieved for the various scheduling results for the UE (20a-202n).

Figure 12:
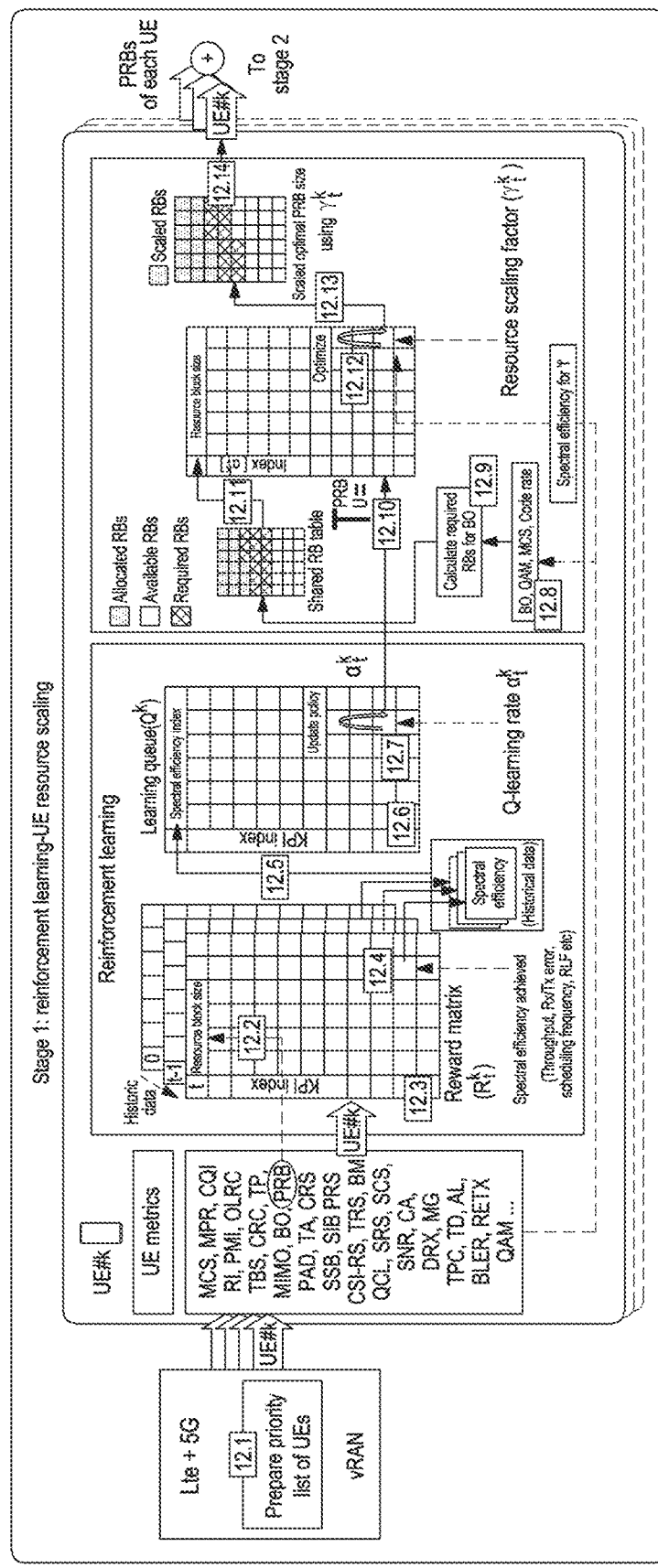
FIG. 12 is a diagram illustrating an example method for determining the optimal radio resource requirements of the active UEs using the UE resource scaling factor of each UE, according to various example embodiments.

Once the UE learning rate is derived, at step 1006/1007, the centralized node 206 determines and optimizes the UE resource scaling factor based on the UE learning rate. The centralized node 206 uses the constructive heuristic based recursive method to determine the radio resource requirements of the UE for the given UE resource scaling factor. The centralized node 206 repeats steps 1002-1006 for all the active UEs 202a-202n and finally determines the cumulative radio resource requirements of the active UEs 202a-202n for each RAT. A flow diagram depicting determination of the cumulative radio resource requirements of the active UEs 202a-202n is depicted in FIG. 12.

Once the cumulative radio resource requirements of the active UEs 202a-202n for each RAT is determined, the centralized node 206 fetches the cell KPI metrics from the RAN 204. The cell KPI metrics may include various scheduling parameters used by the RAN scheduler as well as the spectral efficiency achieved by the overall cell for the previous scheduling results. The spectral efficiency may be measured in terms of the achieved cell throughput, the total Rx/Tx error, the total RLFs or any other performance metric. The centralized node 206 processes the cell KPI metrics, and the achieved spectral efficiency using the RL based Q-learning module 502a to derive the cell learning rate.

At step 1009, the RL based Q-learning module 502a includes the reward matrix R for each UE (202a-202n), which stores the historical spectral efficiency achieved for the various scheduling results for the cell. The historical information may be used to derive the optimal cell learning rate. The RL based Q-learning module 502a uses the off-policy method such as the Q-learning agent that asymptotically converges to the optimal cell learning rate based on the given sufficient exploration on the historical spectral efficiency achieved for the various scheduling results.

Once the cell learning rate is derived, the centralized node 206 determines the DSS pattern scaling factor and the DSS pattern duration scaling factor based on the cell KPI metrics, the cumulative radio resource requirements of the active UEs 202a-202n for each RAT, the last applied DSS pattern and the DSS pattern duration. The centralized node 206 uses the constructive heuristic based recursive method to determine the optimal DSS pattern and the DSS pattern duration (e.g., see 1009). The DSS pattern may be selected from the DSS pattern table, which has been pre-shared across the centralized node 206 and the RAN 204.

Figure 13:
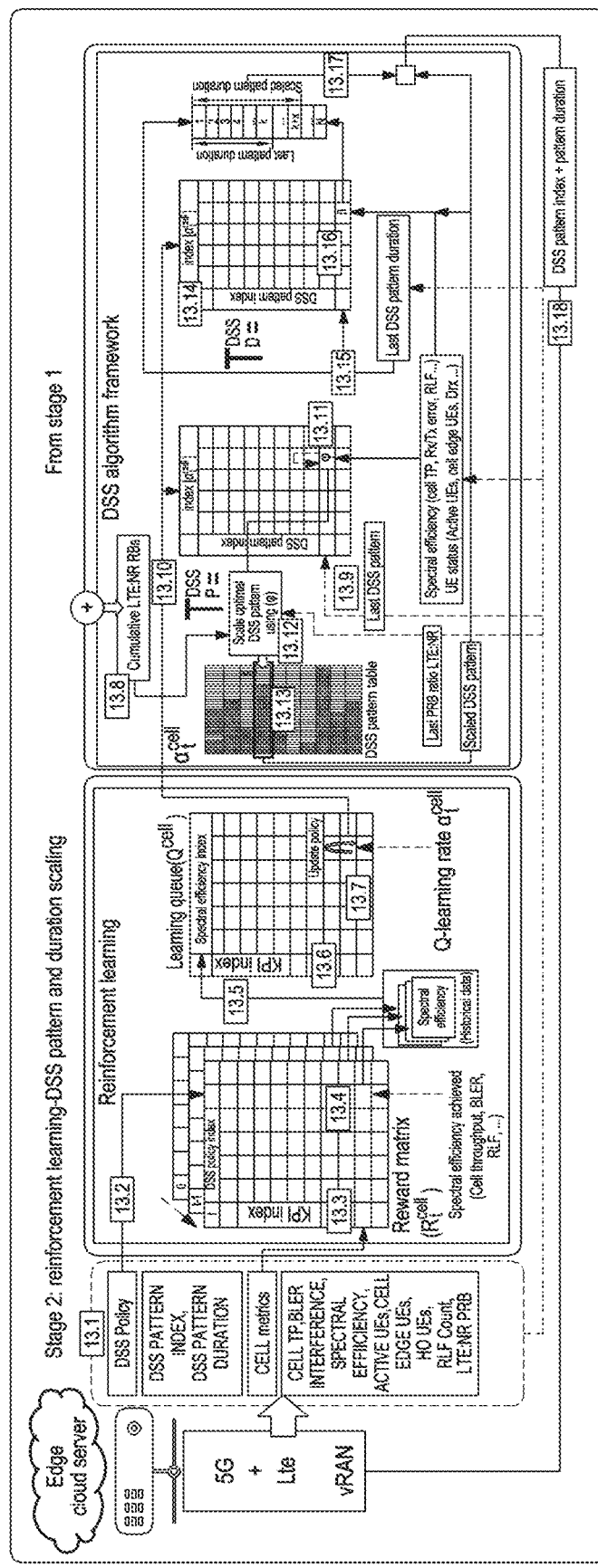
FIG. 13 is a diagram illustrating an example method for determining the DSS policy, according to various example embodiments.

Once the optimal DSS pattern and DSS pattern duration are determined at step 1009, at step 1010, the centralized node 206 may apply the DSS pattern and the DSS pattern duration across the multiple RATs. For the selected DSS pattern from the DSS pattern table, the centralized node 206 conveys the corresponding DSS pattern index to the RAN 204 along with the DSS pattern duration. An example flow diagram for determining the DSS policy based on the cumulative radio resource requirements of the active UEs 202a-202n, and the DSS scaling factors is depicted in FIG. 13. The various actions in method 100 may be performed in the order presented, in a different order or simultaneously. Further, in some embodiments, some actions listed in FIG. 10 may be omitted.

Figure 11:
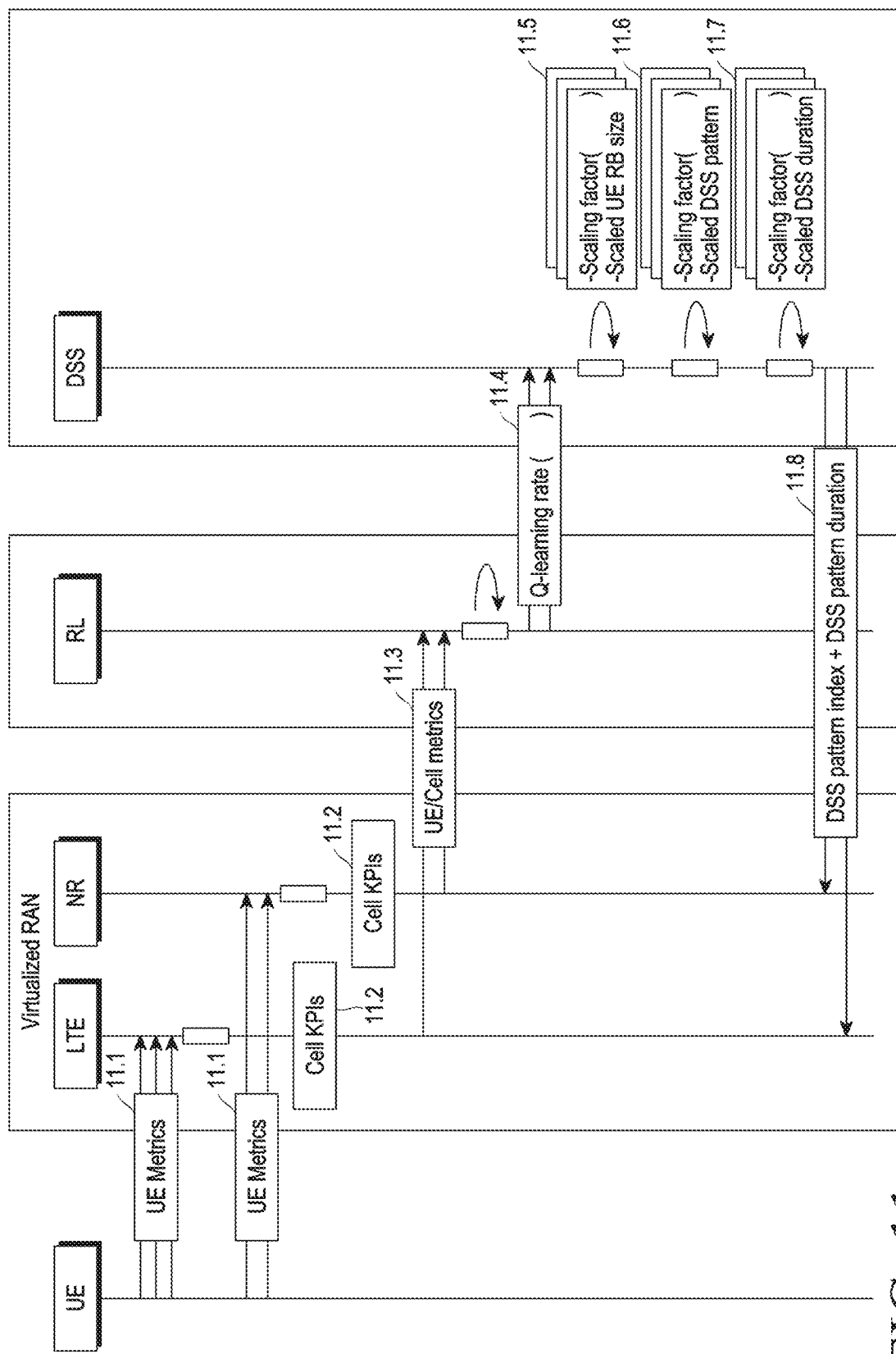
FIG. 11 is a signal flow diagram illustrating an example method for the multi-RAT setup, according to various example embodiments.

FIG. 11 is an example flow diagram depicting a method for the multi-RAT setup, according to certain example embodiments. Embodiments herein consider an LTE network and a NR network as examples of the multiple RATs, but any other RATs may be considered.

As disclosed in FIG. 11, at step 11.1, the NR and the LTE networks of the RAN 204 schedule the UEs 202a-202n as per the existing scheduling methods. The UEs 202a-202n may report the UE KPI metrics for the scheduled resources by the NR and the LTE networks to the RAN 204.

At step 11.2, the LTE and the NR networks may calculate the cell KPI metrics for the scheduling result. The cell KPI metrics may be updated to internal statistics and database for future scheduling.

At step 11.3, the centralized node 206 uses the UE and cell KPI metrics available at the RAN 204 to train the RL based Q-learning module 502a. The agent of the RL based Q-learning module 502a calculates the UE learning rate ($\alpha^{ue}$) for each UE (202a-202n) through iteration over the historical UE KPI metrics (i.e., the UE KPI metrics recorded for the previous scheduling results). The agent of the RL based Q-learning module 502a also calculates the cell learning rate ($\alpha^{cell}$) through iteration over the historical cell KPI metrics (i.e., the cell KPI metrics recorded for the previous scheduling results).

At step 11.4, the centralized node 206 uses the learning rates (the UE learning rate and the cell learning rate) to derive the optimal scaling factors for per UE radio resource, DSS pattern and DSS pattern duration. The scaling factors include the UE resource scaling factor, the DSS pattern scaling factor, and the DSS pattern duration scaling factor.

At step 11.5/11.6/11.7, the centralized node 206 uses the UE learning rate ($\alpha^{ue}$) to derive the UE resource scaling factor ($\gamma^{ue}$). The centralized node 206 uses the UE resource scaling factor to determine the radio resource requirements of the individual UE (202a-202n) and the cumulative radio resource requirements of the plurality of UEs 202a-202n.

The centralized node 206 uses the cell learning rate ($a^{cell}$) and the cumulative radio resource requirements of the plurality of UEs 202a-202n to determine the DSS pattern scaling factor ($\varphi^{cell}$) and the DSS pattern duration scaling factor ($\beta^{cell}$). The optimal DSS pattern scaling factor and DSS pattern duration scaling factor may be decided using the DSS pattern scaling factor ($\varphi^{cell}$) and the DSS pattern duration scaling factor ($\beta^{cell}$)

At step 11.8, the centralized node 206 derives the optimal DSS policy based on the DSS pattern scaling factor and the DSS pattern duration scaling factor. The centralized node 206 updates the LTE and NR RATs about the derived optimal DSS policy.

FIG. 12 is an example flow diagram depicting a method for determining the optimal radio resource requirements of the active UEs 202a-202n using the UE resource scaling factor of each UE, according to certain example embodiments.

At step 12.1, the centralized node 206 receives the UE priority list from the RAN 204, which indicates the active UEs 202a-202n to considered in determining the DSS policy.

At step 12.2/12.3/12.4, the centralized node 206 creates the UE reward matrix for the UE of the active UEs (202a-202n) by analyzing the UE KPI metrics and the UE priority list using the RL based Q-learning module 502a. The UE reward matrix includes the row index as the UE KPI index determined based on the UE KPI metrics monitored in the at least one previous scheduling result and the column index as the resource block size determined based on the previous resource requirements of the UE (202a-202n).

On creating the UE reward matrix, the centralized node 206 determines the UE spectral efficiency achieved by the UE (202a-202n) for the at least one previous scheduling result from the UE reward matrix. The UE spectral efficiency achieved by the UE is in terms of the performance parameters of the respective UE in the at least one previous scheduling result. The centralized node 206 updates the UE reward matrix for each UE (202a-202n) based on the spectral efficiency data measured for each UE (202a-202n) during each scheduling.

Once the reward matrix is updated with the spectral efficiency achieved by the UE (202a-202n) for the previous scheduling result, at step 12.5/12.6, the centralized node 206 creates the learning queue for the UE using the RL based Q-learning module 502a. The centralized node 206 creates the learning queue based on the UE KPI metrics and the UE spectral efficiency achieved for the at least one previous scheduling result. The learning queue includes the row index as the UE KPI metrics and the column index as the spectral efficiency index determined based on the UE spectral efficiency achieved for the at least one previous scheduling result.

Once the learning queue is created, at step 12.7, the centralized node 206 derives the UE learning rate for the UE for the previous scheduling result by analyzing the learning queue created for the UE using/implementing the RL based Q-learning module 502a.

At step 12.8/12.9, the centralized node 206 initially determines the radio resource requirements/PRBs of the UE (202a-202n) using/implementing the UE KPI metrics, the UE metric vector, and so on recorded for the previous scheduling result and the current traffic requirements of the UE (202a-202n). Initially determined PRBs of the UE (202a-202n) are in linear dimension based on the UE metrics vector, wherein radio bearers (RBs) may be allocated from a shared radio bearer table.

At step 12.10/12.11, the centralized node 206 creates the shared radio resource allocation table based on the UE KPI metrics, the current traffic requirements of the UE, and the individual UE resource scaling factor. The shared allocation table indicates the total available radio resources per DSS cell, the radio resources allocated for each UE, and remaining available radio resources for allocation among the UEs. The centralized node 206 determines the previous radio resource requirements of the UE (202a-202n) from the created shared radio resource allocation table.

At step 12.12, the centralized node 206 determines the UE resource scaling factor for the UE (202a-202n) corresponding to the at least one previous scheduling result based on at least one of, the UE learning rate of the UE, the previous radio resource requirements of the UE, and the UE spectral efficiency achieved by the UE for the at least one previous scheduling result. The centralized node 206 may use the constructive heuristic based recursive method to optimize the UE resource scaling factor determined for the UE (202a-202n) for the previous scheduling result.

At step 12.13/12.14, the centralized node 206 optimized the radio resource requirements of each UE by updating the radio resource requirements of each UE using the respective UE resource scaling factor determined based on the UE learning rate. Steps 20.2 to 20.14 may be repeated for the remaining UEs of the active UEs 202a-202n considered for determining the DSS policy. The centralized node 206 may use the optimized radio resource requirements of each UE to determine the cumulative radio resource requirements of all the active UEs 202a-202n. The various operations listed in FIG. 12 may be performed in the order presented, in a different order, simultaneously or contemporaneously. Further, in embodiments, some operations listed in FIG. 12 may be omitted.

FIG. 13 is an example flow diagram depicting a method for determining the DSS policy, according to certain example embodiments.

At step 13.1, the centralized node 206 collects the cell KPI metrics monitored for the at least one previous scheduling result and the current DSS policy.

At step 13.2/13.3/13.4, the centralized node 206 creates the DSS reward matrix for the at least one previous scheduling result by analyzing the collected cell KPI metrics and the current DSS policy using the RL based Q-learning module 502a. The DSS reward matrix includes the row index as the cell KPI index determined based on the cell KPI metrics and the column index as the DSS policy index determined based on the current DSS policy.

At step 13.5/13.6, the centralized node 206 determines the cell spectral efficiency achieved for the at least one previous scheduling result based on the created DSS reward matrix.

At step 13.7, the centralized node 206 generates the cell learning queue for the at least one previous scheduling result by analyzing the cell spectral efficiency achieved with respect to the cell KPI metrics for the at least one previous scheduling result using the Q-learning module. The centralized node 206 determines the cell learning rate for the at least one previous scheduling result based on the generated cell learning queue.

At step 13.8, the centralized node 206 calculates the cumulative radio resources requirements of the active UEs (202a-202n) based on the radio resource requirements of each UE (202a-202n).

At step 13.9, the centralized node 206 creates the DSS pattern scaling factor table based on at least one of, the previously applied DSS pattern, the cell spectral efficiency achieved for the at least one previous scheduling result, the status of each of the plurality of UEs, and the cell learning rate. The DSS pattern scaling factor table includes the row index determined based on the previously applied DSS pattern and the column index determined (at step 13.10) based on the cell learning rate.

At step 13.11, the centralized node 206 determines the DSS pattern scaling factor for the at least one previous scheduling result based on the created DSS pattern scaling factor table.

Figure 14:
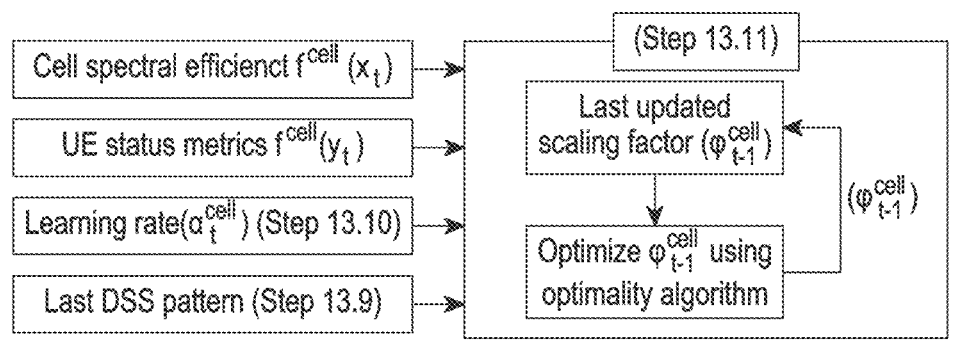
FIG. 14 is a diagram depicting example optimization of a DSS pattern scaling factor, according to various example embodiments.

The centralized node 206 uses the constructive heuristic based recursive method to optimize/update the DSS pattern scaling factor determined for the at least one previous scheduling result based on the previously applied DSS pattern, the status of each of the plurality of UEs, the cell learning rate, and cell performance parameters (as depicted in FIG. 14).

At step 13.12, the centralized node 206 determines the DSS pattern by scaling the current DSS pattern using at least one of, the optimized/updated DSS pattern scaling factor, the cumulative radio resource requirements of the plurality of UEs, and the UE resource requirement ratio. The centralized node 206 may further optimize the DSS pattern as depicted in FIG. 15.

Figure 15:
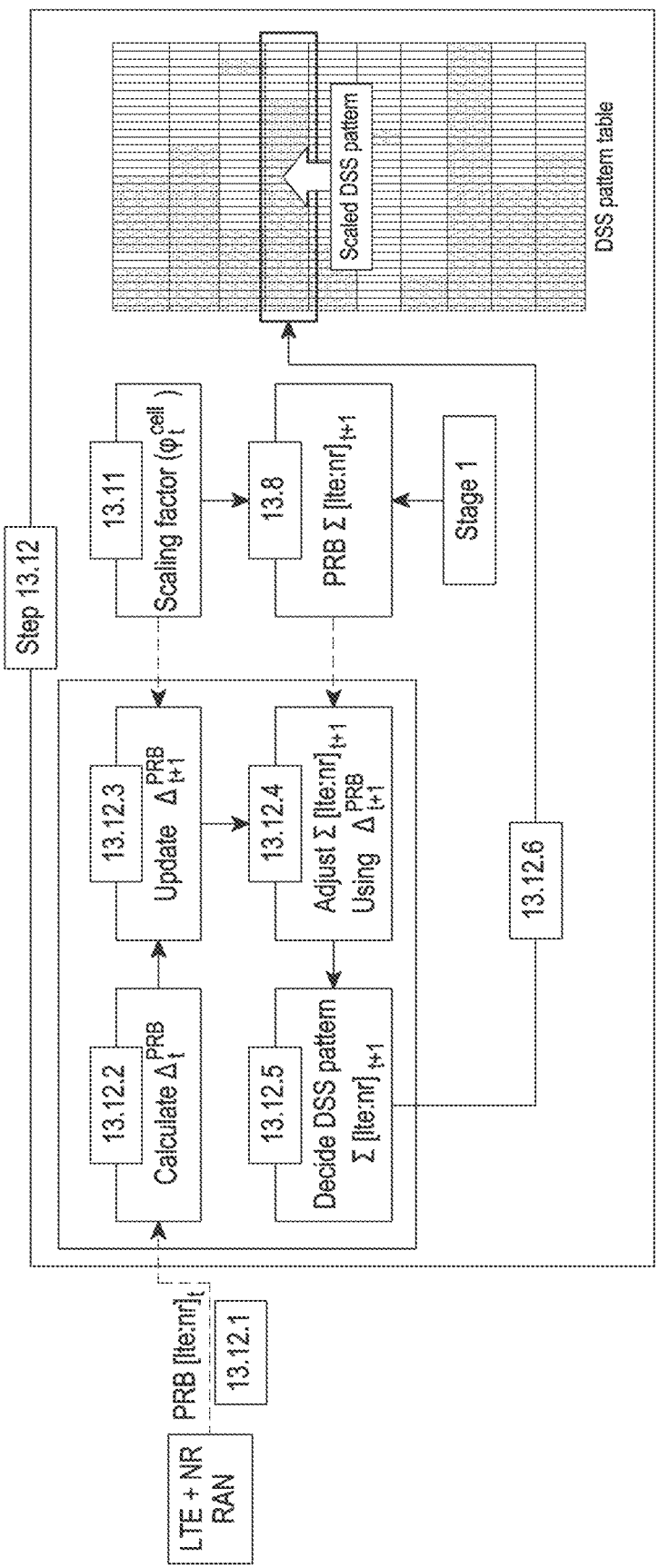
FIG. 15 is a diagram illustrating example optimization of a DSS pattern, according to various example embodiments.

As depicted in example FIG. 15, at step 13.12.1, the centralized node 206 obtains the last PRB allocation ratio/UE resource requirement ratio for the multi-RATs from the RAN 204. In an example herein, consider an LTE/NR PRB ratio.

At step 13.12.2, the centralized node 206 determines a resource allocation ratio difference as:

Resource allocation ratio difference=$\Delta_t^{PRB}$= $|f_t^{PRB}(lte_t) - f_t^{PRB}(nr_t)|$ wherein, $f_t^{PRB}(lte_t)$ may be a percentage ratio of the last DSS PRBs allocated for the LTE and $f_t^{PRB}(nr_t)$ for the NR.

At step 13.12.3, the centralized node 206 scales the resource allocation ratio difference using/implementing the DSS pattern scaling factor as:

$\Delta_{t+1}^{PRB} = \Delta_t^{PRB} \times \varphi_t^{cell}$ wherein, if the $\Delta_t^{PRB}$ is zero, then a suitable non-zero pre-defined heuristic value may be used.

At step 13.12.4, the centralized node 206 obtains the current cumulative LTE:NR PRBs required for all the active UEs 202a-202n ($f_{t+1}^{PRB}(lte_{t+1})$: $f_{t+1}^{PRB}(nr_{t+1})$).

At step 13.12.5, the centralized node 206 adjusts the ($f_{t+1}^{PRB}(lte_{t+1})$: $f_{t+1}^{PRB}(nr_{t+1})$) as per the scaled resource allocation ratio difference, so that $\Delta_{t+1}^{PRB} = f_{t+1}^{PRB}(lte_{t+1})$: $f_{t+1}^{PRB}(nr_t+1)$).

At step 13.12.6, the centralized node 206 uses the scaled ($f_{t+1}^{PRB}(lte_{t+1})$: $f_{t+1}^{PRB}(nr_{t+1})$) to decide the matching DSS pattern, DSS_PATTERN$_{t+1}^{cell}$ from the DSS pattern table for the next RAN schedule t+1.

At step 13.14/13.15, the centralized node 206 creates the DSS pattern duration scaling factor table for the at least one previous scheduling result based on a previously applied DSS pattern duration, and the cell learning rate. The DSS pattern duration scaling factor table includes the row index determined based on the previously applied DSS pattern duration, and the column index determined based on the cell learning rate. The centralized node 206 determines the DSS pattern duration scaling factor from the DSS pattern duration scaling factor table for the at least one previous scheduling result.

At step 13.16, the centralized node 206 optimizes/updates the DSS pattern duration scaling factor determined for the at least one previous scheduling result based on at least one of, the cell learning rate, the cell spectral efficiency, the status of each of the plurality of UEs/active UEs 202a-202n, and the scaled DSS pattern. The cell spectral efficiency and the status of the UEs received from the RAN 204 for the previous scheduling result may be approximated to percentile, to express in absolute scale, as depicted at step 13.11. the centralized node 206 determines the DSS pattern duration by scaling the current DSS pattern duration using the updated DSS pattern duration scaling factor.

At step 13.17, the centralized node 206 optimizes the DSS pattern duration using the optimized DSS pattern duration scaling factor. For optimizing the DSS pattern duration, at step 13.17.1, the centralized node 206 obtains the last DSS pattern duration (DSS_DURATION$_t^{cell}$) applied from the RAN 204. At step 13.12.5, the centralized node 206 scales the DSS_DURATION$_t^{cell}$ to an optimal value using the DSS pattern duration scaling factor. The DSS_DURATION$_t^{cell}$ may be scaled as:

DSS_DURATION$_{t+1}^{cell}$=Min[(DSS$_{DURATION}^{cell} \times \beta_t^{cell}$, MAX_Duration$^{cell}$ At step 13.18, the centralized node 206 sends the scaled DSS policy [DSS_PATTERN$_{t+1}^{cell}$, DSS_DURATION$_{t+1}^{cell}$] to the RAN 204, to apply in the next RAN schedule t+1.

The various operations listed in FIG. 13 may be performed in the order presented, in a different order, simultaneously or contemporaneously. Further, in embodiments, some operations listed in FIG. 13 may be omitted.

Figure 16:
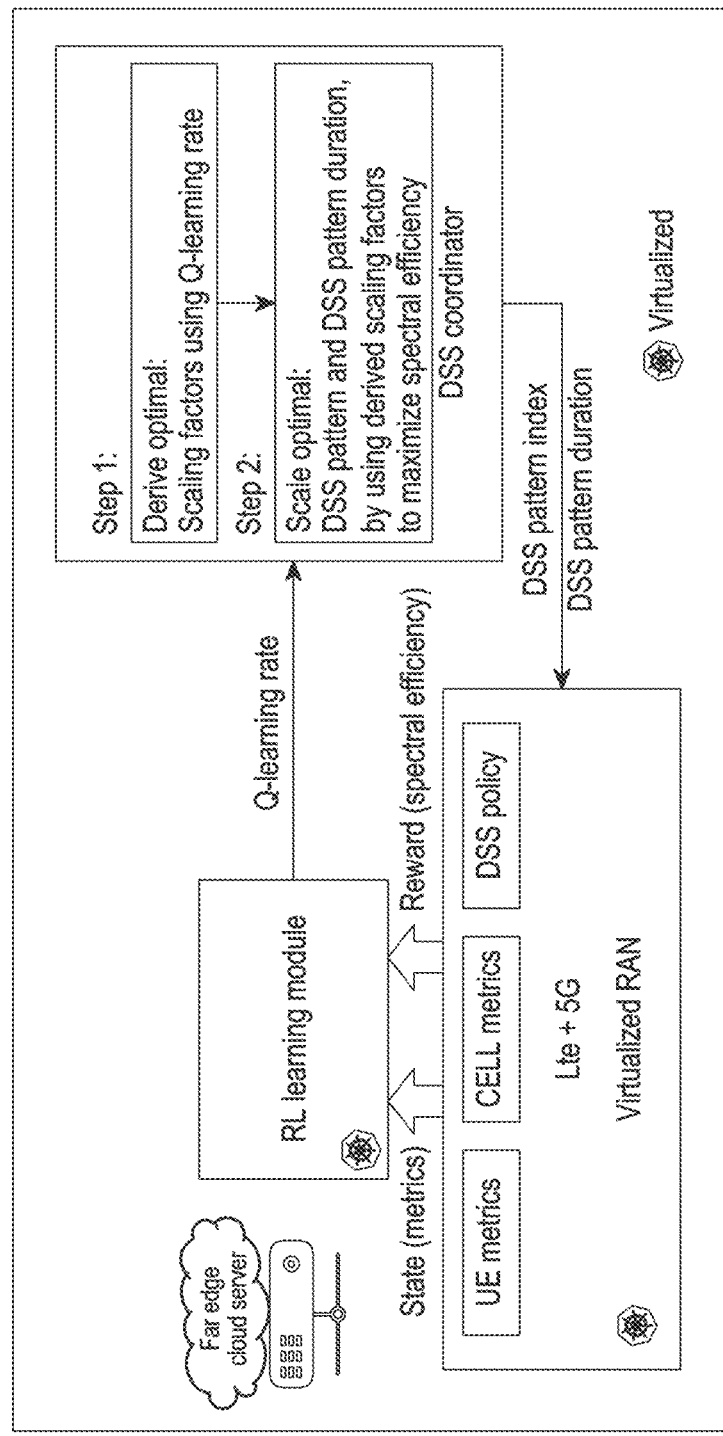
FIG. 16 is a diagram illustrating example determination of the DSS policy for scheduling the radio resources across the multiple RATs, according to various example embodiments.

FIG. 16 is an example diagram depicting determination of the DSS policy for scheduling the radio resources across the multiple RATs, according to certain example embodiments. Certain example embodiments herein may enable the centralized node 206 to determine the DSS policy across the multiple RATs using the RL based Q-learning module 502a.

The centralized node 206 receives parameters such as, but are not limited to, the UE KPI metrics, the cell KPI metrics, the previous DSS policy, or the like recorded for the at least one previous scheduling result. The centralized node 206 processes the received parameters using the RL based Q-learning module 502a and determines the UE learning rate and the cell learning rate. The centralized node 206 uses the UE learning rate and the cell learning rate to derive the plurality of scaling factors. The plurality of scaling factors includes the UE resource scaling factor, the DSS pattern scaling factor, and the DSS pattern duration scaling factor. Based on the derived plurality of scaling factors, the centralized node 206 determines the DSS policy across the multiple RATs to optimize the spectral efficiency. The DSS policy includes the DSS pattern and the DSS pattern duration.

The DSS pattern indicates the radio resource sharing information between the multiple RATs. The radio resource sharing information may be either the S-DSS policy resource sharing or the F-DSS policy resource sharing.

Figure 17A:
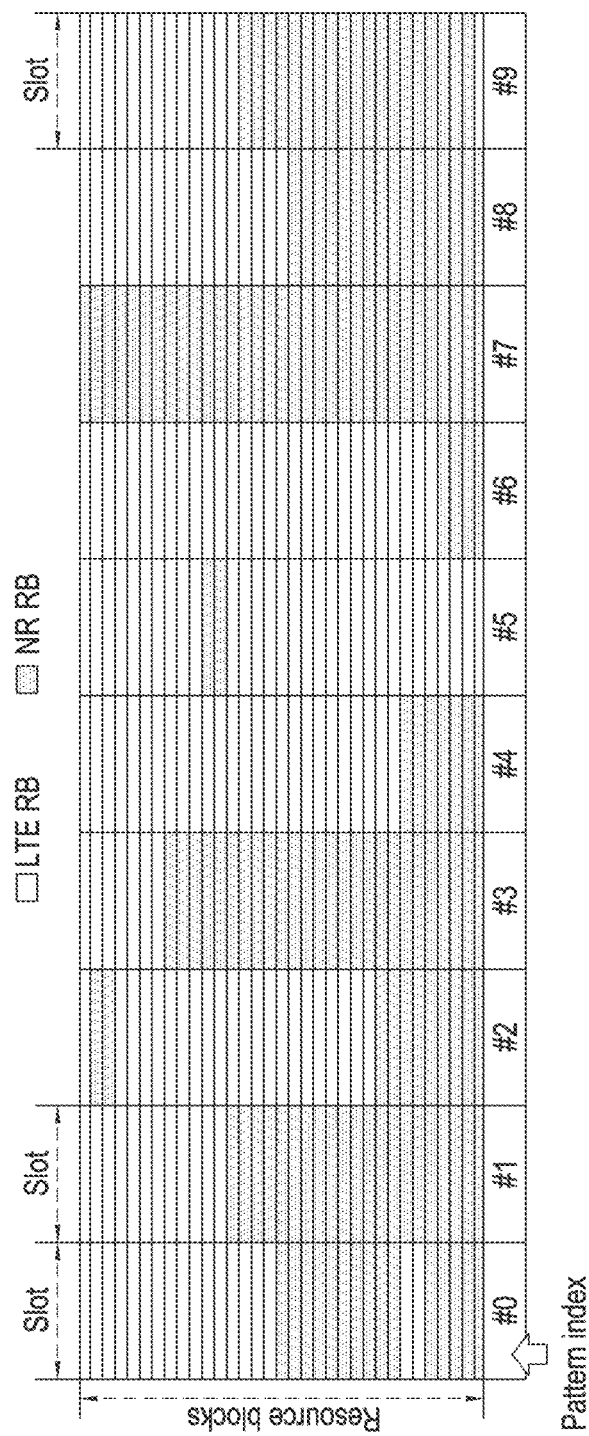
Figure 17B:
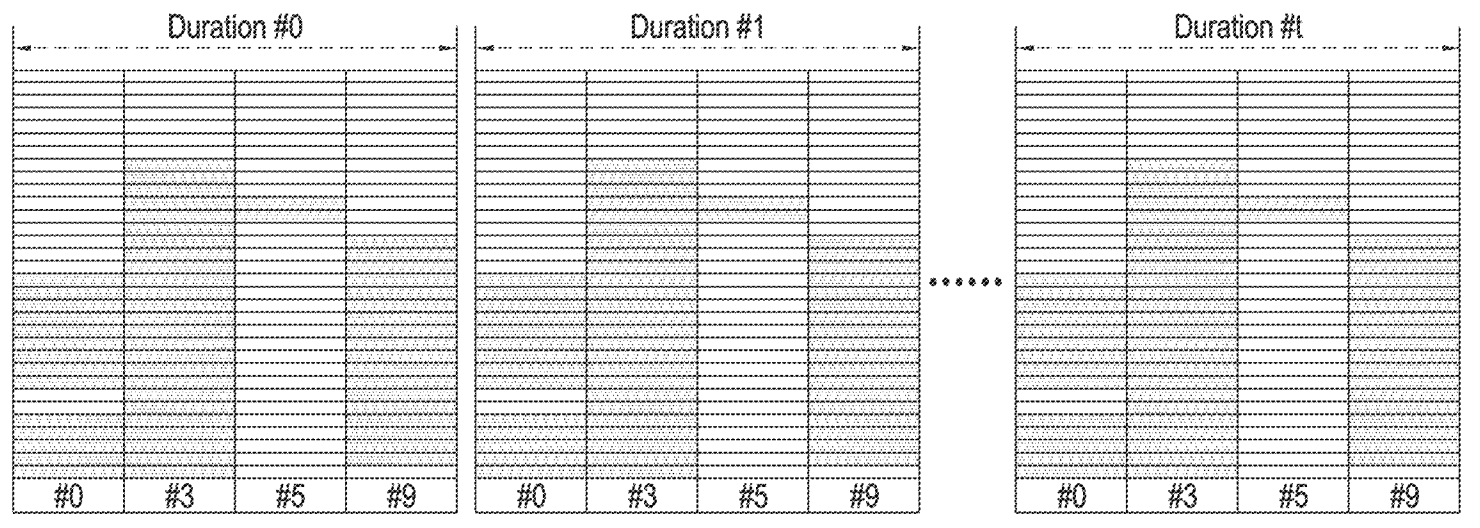

The DSS pattern determined across an LTE network and a NR network using the existing methods is depicted in FIG. 17A as an example, which may lead to the reduced spectral efficiency. In contrast, the S-DSS policy resource sharing determined based on the scaling factors across the LTE network and the NR network is depicted in FIG. 17B as an example, which optimizes the spectral efficiency.

Figure 18:
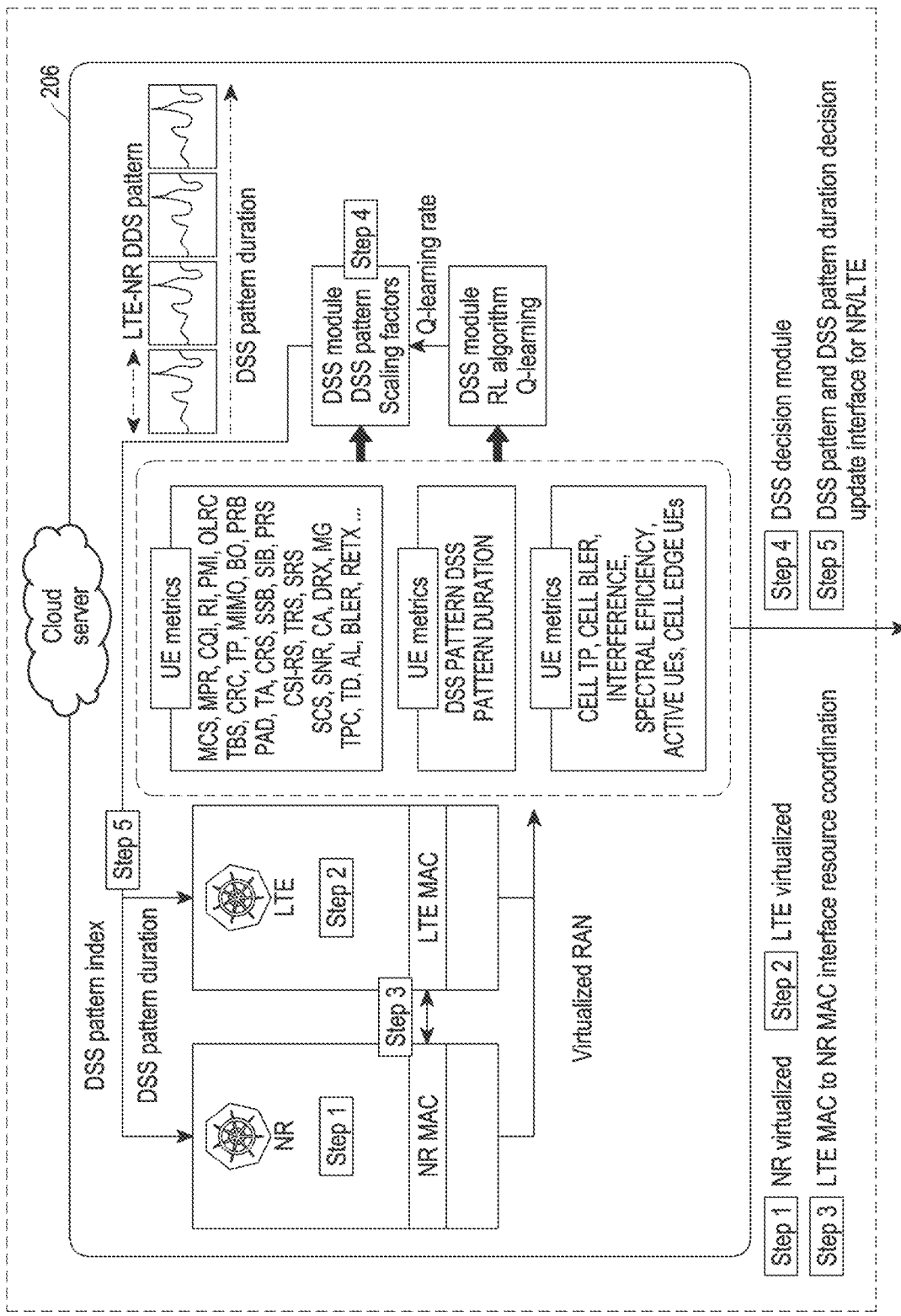
FIG. 18 is a diagram illustrating an example of determining of the DSS policy across the LTE network and the NR network, according to various example embodiments.

FIG. 18 is an example diagram depicting determining of the DSS policy across the LTE network and the NR network, according to certain example embodiments.

As depicted in FIG. 18, the centralized node 206 (for example, a cloud server) receives the parameters of the LTE network and the NR network from the RAN 204 (for example, a virtualized RAN). The parameters may include the UE KPI metrics, the cell KPI metrics, and the DSS policy/DSS metrics of the LTE network and the NR network monitored for the at least one previous scheduling result. The centralized node 206 feeds the received parameters to the RL based Q-learning module 502a, which derives the learning rate from the received parameters. The centralized node 206 determines the scaling factors based on the learning rate. Based on the scaling factors, the centralized node 206 determines the optimal radio resources for the UE (202a-202n), and the DSS pattern and the DSS pattern duration across the LTE network and the NR network. Thus, maximizing or increasing the KPI metrics such as, the cell throughput, UE service experience, reduced transmission/reception errors, and so on. In addition, optimizing the radio resources for the UEs (202a-202n) and optimizing the DSS pattern and the DSS pattern duration across the multiple RATs may overcome obstacles/drawbacks imposed by the existing DSS determination methods, where the DSS pattern allocation, the DSS pattern duration, and the multi-RAT resources sharing are in linear fixed dimension of traffic needs and active UE Count, and mapping to pre-defined patterns, which may lead to lower spectral efficiency.

As depicted in FIG. 18 as an example, at step 1 (KPI metrics collection), the radio/RAN scheduler 302 at the RAN 204 schedules the air resources to the individual active UEs 202a-202n, according to scheduling methods performed based on the various UE KPI metrics and the cell KPI metrics with reference to results of the at least one previous scheduling result. The RAN scheduler 302 may allocate the air resources to the individual active UEs 202a-202n at every transmit time interval (TTI) unit at the RAN 204. The UE KPI metrics and the cell KPI metrics may be readily available at a MAC layer of the RAN scheduler 302, of the granularity of the TTI. The UE KPI metrics may include copies of the Layer 1/Layer 2 metrics of the RAN stack, which may be used for scheduling the radio resources. Examples of the UE KPI metrics may be, but are not limited to, resource allocation and link adaptation, Examples of the UE KPI metrics is depicted in FIG. 19. The cell KPI metrics comprises of the DSS pattern and the DSS pattern duration applied during the at least one previous scheduling result, the cell throughput, the total number of active UEs, the cell edge/handover UEs, the spectral efficiency achieved, time information, cell location, load balancing, and so on. The RAN scheduler 302 of the RAN 204 provides the collected UE KPI metrics, and the cell KPI metrics to the centralized node 206.

At step 2, the centralized node 206 uses the RL based Q-learning module 502a to derive the learning rate based on the collected metrics. The RL based Q-learning module 502a may be a goal-oriented method, which learns how the attain a complex objective (goal) or how to maximize or improve along a particular dimension over many steps. The RL based Q-learning module 502a includes learning agents, such as, Q-learning agents, which may be used to derive the learning rate based on at least one of, the collected metrics, historical behavior under various channel and scheduling conditions for each UE and cell, and so on. An example representation of the RL based Q-learning module 502a using agents, environments, states, actions, and rewards is depicted in FIG. 20.

Figure 20:
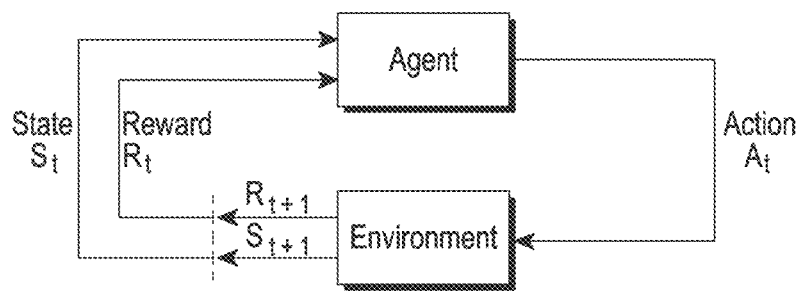
FIG. 20 is a block diagram illustrating an example reinforcement learning (RL) based Q-learning module, according to various example embodiments.

As depicted in FIG. 20, the agent may take the actions from a list of discrete, possible actions. The state is a concrete and immediate situation in which the agent finds itself. The environment takes the current state of the agent and the action as an input and returns a reward of the agent and a next state as an output. The reward may be a feedback by which a success or failure of the action of the agent in a given state.

The RL based Q-learning module 502a may use the historic KPIs (the cell KPI metrics and the UE KPI metrics) achieved for each DSS policy and determine the learning rate. The agent/Q-learning agent chooses an action (Learning Rate $a_t^{ue}/a_t^{cell}$) from the given state (UE/cell KPI metrics) and receives the rewards based on the chosen action by successive iterations on the historical KPI metrics and rewards. In an example herein, the rewards may include the spectral efficiency in terms of the UE/cell throughput, the Tx/Rx error, service experience, and so on.

Once the learning rate is derived, at step 3, the centralized node 206 determines the DSS pattern and the DSS pattern duration using the scaling factors determined based on the learning rate. The centralized node 206 uses the learning rate predicted by the RL based Q-learning module 502a to determine the scaling factors to scale the optimal UE resources, the DSS pattern, and the DSS pattern duration, so as to maximize and/or improve the KPI metrics such as, the cell throughput, the UE service experience and reduce the Tx/Rx errors, and so on. The centralized node 206 further uses a Markov Decision Process (MDP) and the constructive heuristic based recursive method (for example, a Bellman optimality method) to optimize the scaling factors. The scaling factors include the UE resource scaling factor, the DSS pattern scaling factor, and the DSS pattern duration scaling factor.

Embodiments herein describe the determination of the UE resource scaling factor (at step 3 (UE radio resource scaling).

Consider an example scenario, wherein 's' may be a state (depicting the radio resource requirements of the UE (202a-202n), the learning Rate (at) derived from the RL based Q-learning module using the UE KPI M=metrics), 'a' may be an action (scaling factor prediction). In such a scenario, the centralized node 206 converges the UE resource scaling factor $\gamma_t$ for the UE k to the optimal UE resource scaling factor as:

$$gk_{t+1}(s) = \max\{\Sigma P_a(s'|s)(R_a(s'|s) + \alpha_t^k \gamma_t^k(s'))\}$$

wherein, Pa(s'|s) may be the probability that the action 'a' (the UE resource scaling factor $\gamma_t$ decision) in the state 's' (spectral efficiency, the learning rate at) at time t may lead to the state 's'' at time t+1 (next schedule). $R_a$(s'|s) may be an expected reward (UE spectral efficiency) after transition from the state 's' to the state 's'' due to the action 'a'. Using the predicted UE resource scaling factor $\gamma_t^k$, the optimal radio resource requirements of the UE 'k' (the PRBs required for the UE 'k') may be scaled.

The above described procedure may be applicable to all the 'n' active UEs (1, . . . k, k+1, . . . n−1, n) using the individual UE resource scaling factors ($\gamma_t^1, \gamma_t^2, \gamma_t^3, \ldots \gamma_t^k, \gamma_t^{k+1}, \ldots \gamma_t^n$) derived using the individual learning rates ($\alpha_t^1, \alpha_t^2, \ldots \alpha_t^k, \alpha_t^{k+1}, \ldots$ at) of each UE (202a-202n).

Embodiments herein describe the determination of the DSS patter scaling factor (at step 3 (DSS pattern scaling).

Consider an example scenario, wherein 's'' may be a state (the learning Rate (at) derived from the RL based Q-learning module 502a using the cell KPI metrics, and the cumulative and scaled radio resources requirements of the active UEs 202a-202n), 'a' may be an action (scaling factor prediction for the DSS pattern). In such a scenario, the centralized node 206 converges the DSS pattern scaling factor $\varphi_t^{cell}$ for the UE k to the optimal DSS pattern scaling factor as:

$$\varphi_{t+1}^{cell} = \max\{\Sigma P_a(s'|s)(R_a(s'|s) + \alpha_t^k \varphi_t^{cell}(s'))\}$$

wherein, $R_a(s'|s)$ may be the reward (cell spectral efficiency) after transitioning from the state 's'' to the state 's'' due to the action 'a'.

Embodiments herein describe the determination of the DSS patter duration scaling factor (at step 3.3 (DSS pattern duration scaling).

Consider an example scenario, wherein 's'' may be a state (the learning Rate ($a_t^k$) derived from the RL based Q-learning module 502a using the cell KPI metrics, and the scaled DSS pattern), 'a' may be an action (scaling factor prediction for the DSS pattern duration). In such a scenario, the centralized node 206 converges the DSS pattern duration scaling factor $\beta_t^{cell}$ for the UE k to the optimal DSS pattern duration scaling factor as:

$$\beta_{t+1}^{cell} += \max\{\Sigma P_a(s'|s)(R_a(s'|s) + \alpha_t^k \beta^{cell}(s'))\}$$

wherein, (s'|s) may be the reward (cell spectral efficiency) after transitioning from the state 's'' to the state 's'' due to the action 'a'.

At step 4, the centralized node 206 determines the DSS policy (including the DSS pattern and the DSS pattern duration) based on the DSS pattern scaling factor, the DSS pattern duration scaling factor, and the cumulative radio resource requirements of all the UEs 202a-202n.

At step 5, the centralized node 206 shares the DSS policy with the RAN 204 including the LTE network and the NR network.

Figure 21:
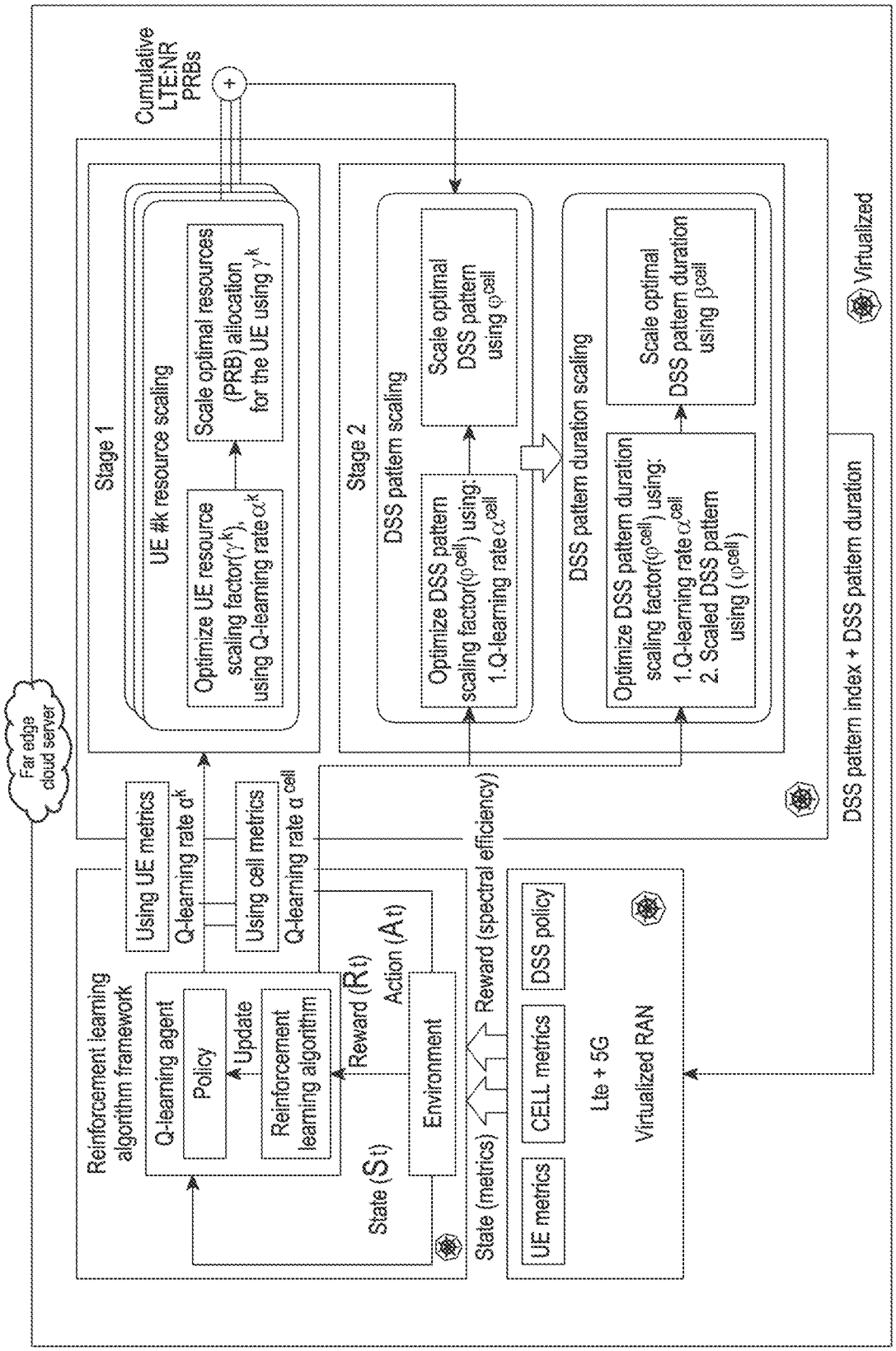
FIG. 21 is a diagram illustrating example determination of the DSS policy using the RL based Q-learning module, according to various example embodiments.

FIG. 21 is an example flow diagram depicting determination of the DSS policy using the RL based Q-learning module 502a, according to certain example embodiments as disclosed herein.

At stage 1, the centralized node 206 receives the parameters such as, but are not limited to, the UE KPI metrics, the cell KPI metrics, the DSS policy, and so on, recorded for the at least one previous scheduling result from the RAN 204.

At stage 2, the centralized node 206 derives the UE learning rate and the cell learning rate from the received parameters using the RL based Q-learning module 502a. The RL based Q-learning module 502a derives the UE/cell learning rate (the learning rate). Deriving the UE/cell learning rate using the RL based Q-learning module 502a is depicted in FIG. 22.

Figure 22:
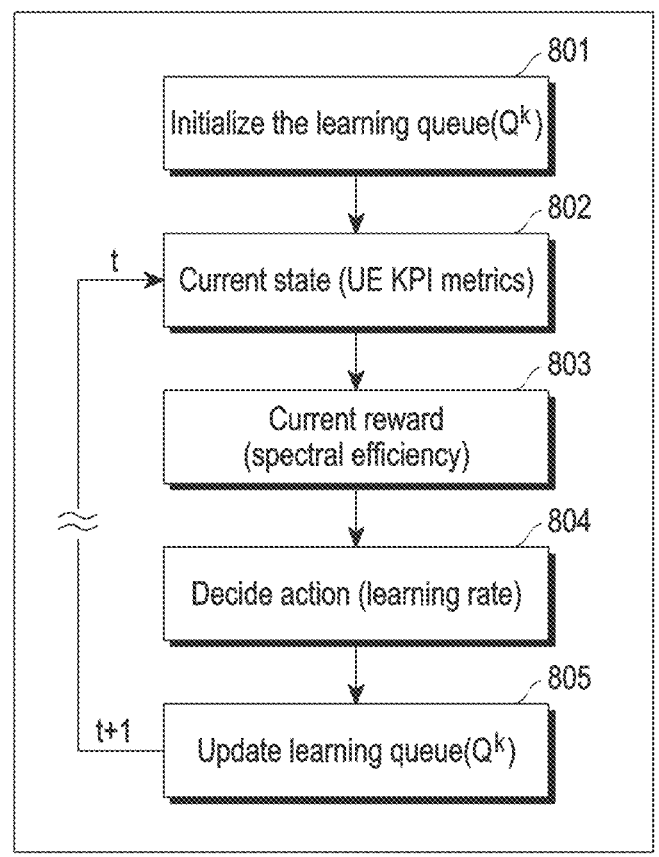
FIG. 22 is a diagram depicting example derivation of a learning rate using the RL based Q-learning module, according to various example embodiments.

As depicted in FIG. 22, the RL based Q-learning module 502a may be used to derive and optimize the learning rate by performing iterations over a period of time. The RL based Q-learning module 502a may optimize/improve the learning rate using a feedback received from the previous optimization of the learning rate.

The RL based Q-learning module 502a uses an off-policy learner such as, Q-learning agent (which may comprise circuitry), or the like to derive the optimal learning rate based on the UE KPI metrics, the cell metrics, the DSS policy, or the like recorded for the at least one previous scheduling result.

The RL based Q-learning module 502a also uses the epsilon value computed based on the epsilon greedy method to predict an optimal value for the learning rate. The epsilon value refers to a probability of choosing to explore smaller optimality at a time, since, at the beginning, the RL based Q-learning module 502a does not have credible learning rates due to unavailability of the UE KPI metrics and the spectral efficiency for various channel conditions. The epsilon rate/value for the learning rate may decrease over the period of time, as the RL based Q-learning module 502a starts to predict the most optimal values for the learning rates for the given UE metrics.

As depicted in FIG. 22, at step 801, the RL based Q-learning module 502a initializes the learning queue. At steps 802 and 803, the RL based Q-learning module 502a determines a current state as the UE KPI metrics, and a current reward as the spectral efficiency monitored over the various channel conditions. At step 804, the RL based Q-learning module 502a decides an action, that is to derive the learning rate based on the epsilon value, the UE KPI metrics, the spectral efficiency, and so on. At step 805, the RL based Q-learning module 502a updates the learning queue. The RL based Q-learning module 502a recursively performs steps 2-4, until the learning rate is optimized.

On deriving the learning rate (the UE learning rate and the cell learning rate), the centralized node 206 derives the scaling factors and uses the scaling factors to determine the DSS policy to schedule the radio resources across the multiple RATs. The centralized node 206 derives and optimizes the UE resource scaling factor based on the UE learning rate. The centralized node 206 determines the radio resource requirements of each UE (202a-202n) based on the UE resource scaling factor of each UE (202a-202n). The centralized node 206 then determines the cumulative radio resource requirements of the plurality of UEs 202a-202n based on the radio resource requirements of each UE.

The centralized node 206 derives and optimizes the DSS pattern scaling factor based on the cell learning rate. The centralized node 206 also derives and optimizes the DSS pattern duration scaling factor based on the cell learning rate and the DSS pattern scaling factor.

The centralized node 206 then determines the DSS policy including the DSS pattern and the DSS pattern duration across the multiple RATs to schedule the radio resources for the UEs 202a-202n. The centralized node 206 determines the DSS policy based on the cumulative radio resources requirements of the plurality of UEs 202a-202n, the cell KPI metrics, the DSS pattern scaling factor, and the DSS pattern duration scaling factor.

Figure 23:
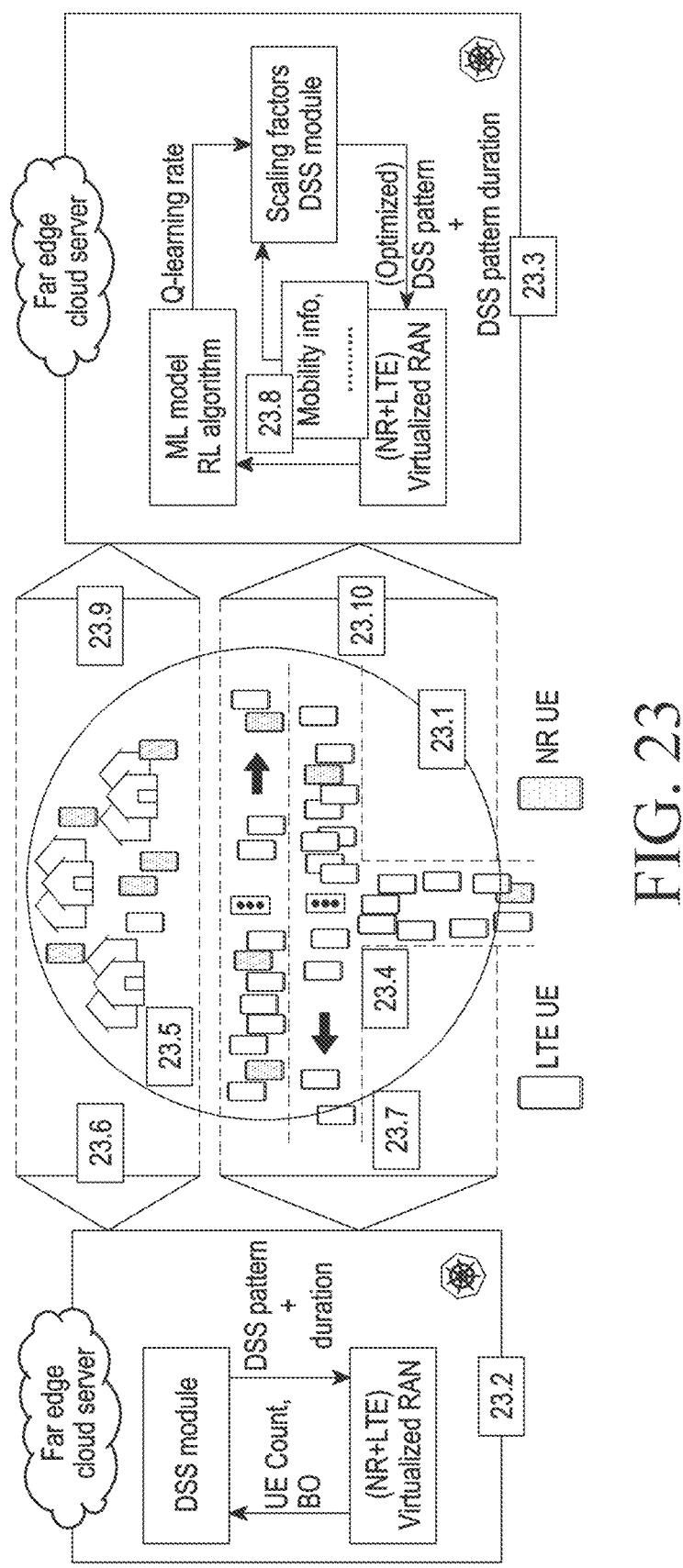
FIGS. 23 and 24 are diagrams illustrating example use case scenarios of determining the efficient DSS policy using the UE priority list and the scaling factors, according to various example embodiments.
Figure 24:
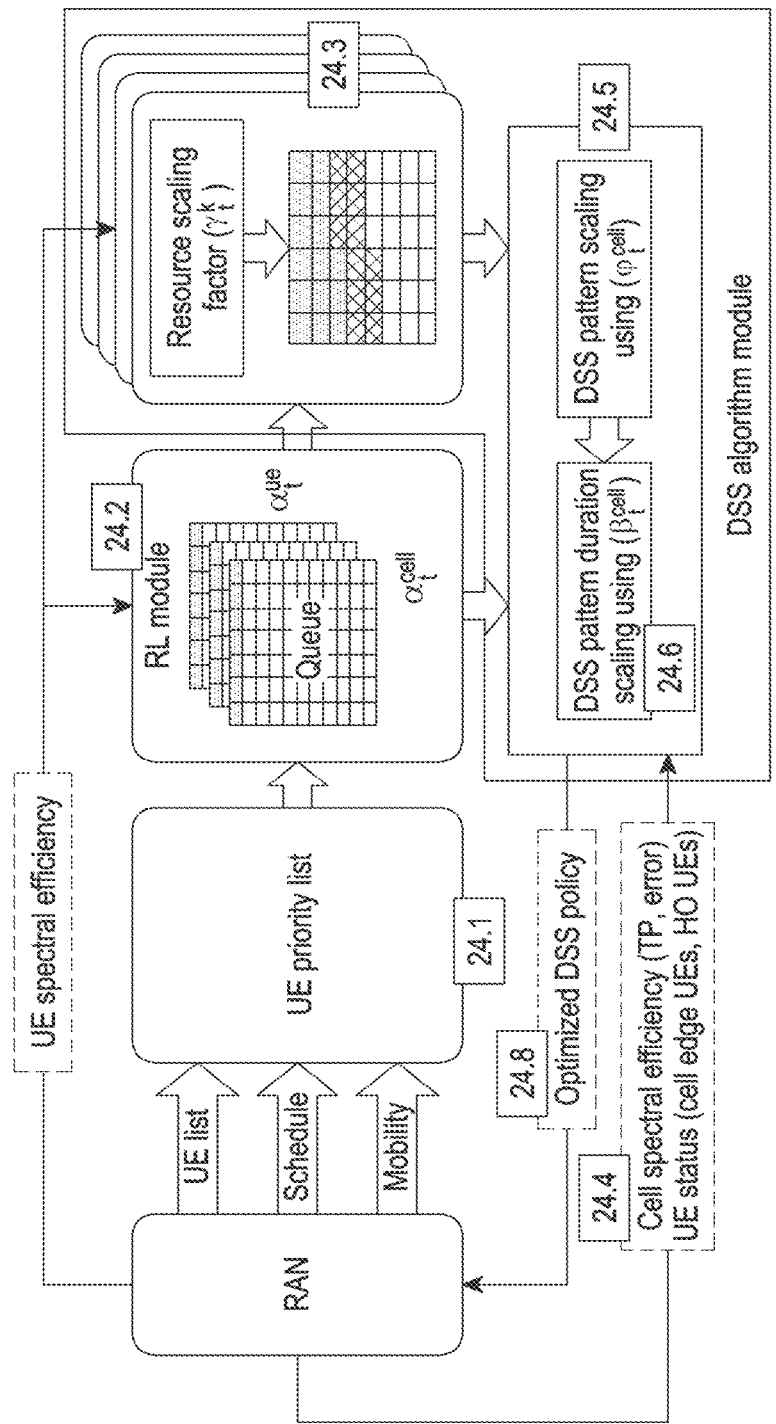

FIGS. 23 and 24 are example diagrams depicting a use case scenario of determining the efficient DSS policy using the UE priority list and the scaling factors, according to certain example embodiments.

As depicted in FIG. 23, 23.1 depicts a typical DSS cell supporting multi-RAT (for example, LTE and NR) spectrum sharing. Based on the nature of the cell deployment, a large number of the UEs in the cell (23.4) are on high mobility condition (for example, a busy highway) and a sizeable portion of the UEs are in lesser mobility conditions (23.5) (for example, a residential area). In such a scenario, determining the DSS policy using the existing methods may degrade the cell performance and user service experience, since the existing methods determine the DSS policy only based on the active UE count and total traffic requirements. The DSS policy determined using the existing methods may largely benefit the high mobility UEs (23.7) and the UEs on lesser mobility (23.6) may suffer from the performance degradation and scheduling delays. In contrast, embodiments herein may enable the centralized node 206 to determine the DSS policy by overcoming the above-described drawbacks. The DSS policy determined according to embodiments herein may benefit the UEs on lesser mobility, to achieve better performance. The better performance may be achieved using a UE priority policy (24.1) chosen/UE priority list, and the KPI metrics of the mobility (handover)/cell edge UEs.

The UE priority policy may be tuneable in such a way that the UEs 202*a*-202*n* with lesser mobility and higher scheduling history may be given priority over the UEs 202*a*-202*n* at the cell edge and in the handover threshold. Higher UE priority may ensure better learning rate (24.2) and consistent radio resource allocation consideration (24.3), which may impact the DSS policy determination (24.8) in favour.

The high mobility (handover)/cell edge UE metrics (24.4) may ensure better DSS pattern/DSS pattern duration scaling factor optimization (24.5/24.6), The high mobility/cell edge threshold criteria may be configured by higher layers and primarily comprises of signal conditions of the UE such as, but are not limited to, the SINR, CQI, timing advance (TA), neighbor cell signal, and so on.

Figure 25A:
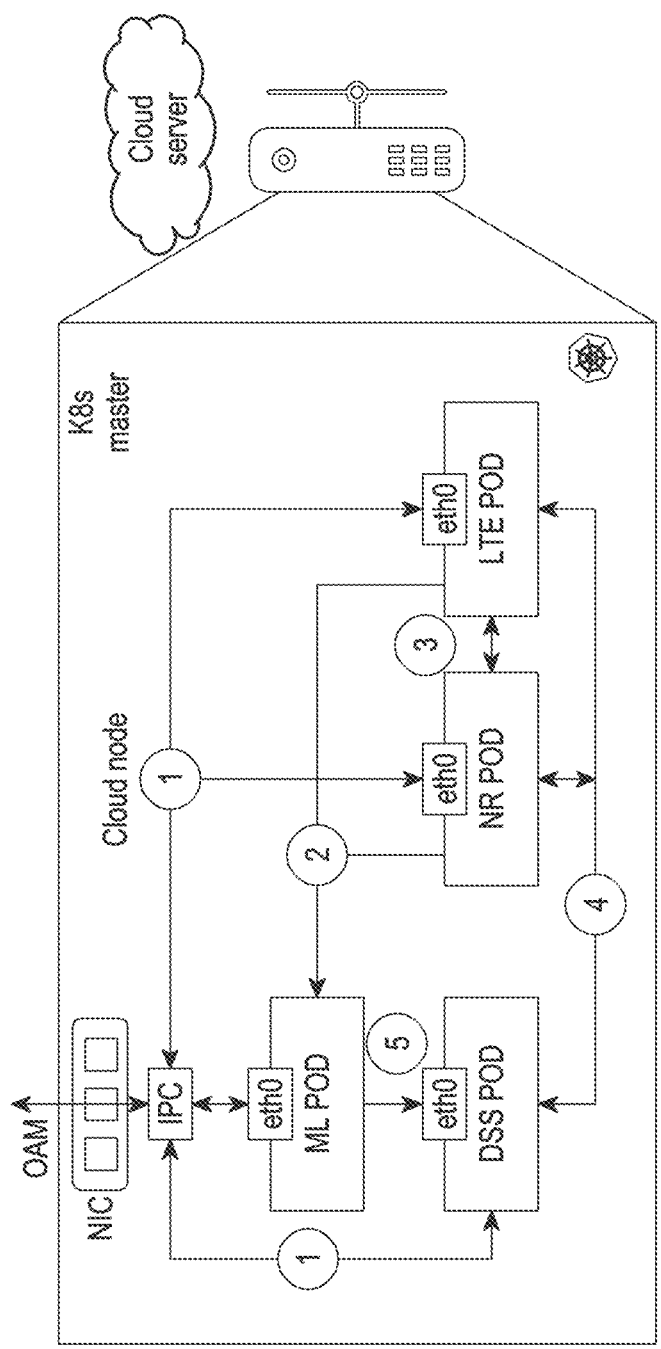
FIGS. 25A and 25B are diagrams illustrating example system models for realizing the determination of the DSS policy over the centralized node, wherein the centralized node \may be a cloud server/cloud based server, according to various example embodiments.
Figure 25B:
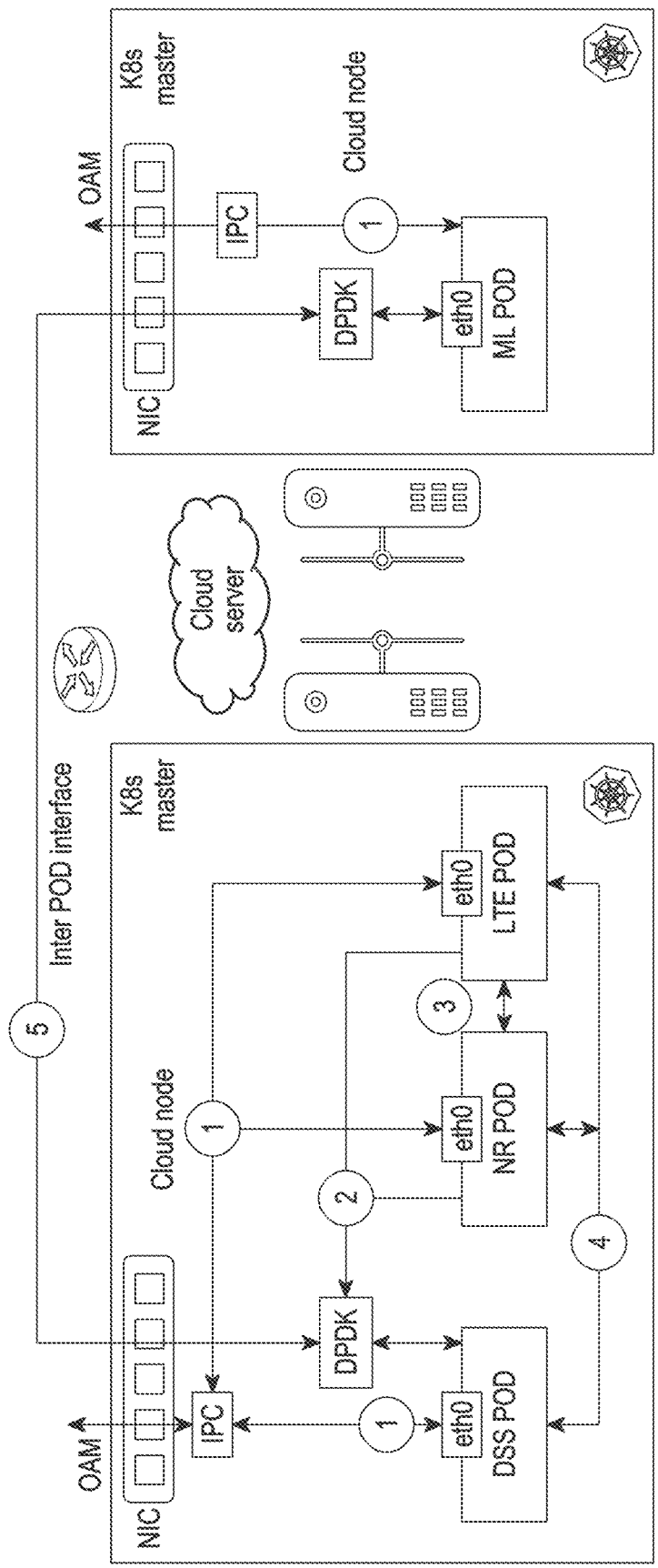

FIGS. 25A and 25B are example system models for realizing the determination of the DSS policy over the centralized node 206, wherein the centralized node 206 may be a cloud server/cloud based server 206, according to certain example embodiments. Through the DSS pattern determination described in the embodiments herein may be realized over a conventional server platform, a network virtualization architecture may be used for the deployment as an efficient solution, since the network virtualization architecture may have significantly lesser delay compared to the conventional server platform to server communication and have the flexibility for dimensioning.

In an example, the multiple RATs may be containerized (virtualized) as individual pods for greater scalability. The pods may communicate with other pods, regardless of which host on which the pods are being executing/running. Interfaces exist between the different pods within the cloud server 206 as well as for outside entities. The DSS pattern determination module 600 and the RL based Q-learning module 502*a* may be deployed as separate pods for example, a DSS pod and a machine learning (ML) pod, respectively.

As depicted in FIGS. 25A, and 25B, each pod may have a communication port (eth0) including an individual cluster-private IP address to communication with other pods. The interfaces exit between the different pods are described below:

- an interface 1: the interface 1 may be used for inter process communication (IPC) over an ethernet interface (NIC) to communicate to the external entities such as, but are not limited to a system administration-operation and management server (OAM), or the like;
- an interface 2: the interface 2 may be used for the communication between the RL based learning module 502*a* (the ML Pod) and the multi-RAT pod (for example, a NR pod and an LTE pod, if the LTE network and NR network are considered as multiple RATs);
- an interface 3: the interface 3 may be used for communication between the multi-RAT pods (for example, the LTE pod and the NR pod) possibly between a layer 2 or a layer 3 or above for resource coordination;
- an interface 4: the interface 4 may be used between the DSS pod and the multi-RAT pod (multi-RAT lower layers) for sharing the DSS pattern policy updation; and
- an interface 5: the interface 5 may exist between the RL based Q-learning module 502*a* (i.e., the ML pod) and the DSS pod for updating the learning rate to the DSS pattern determination module 600. The updated learning rate may be used by the DSS pattern determination module 600 for deriving the scaling factors.

As depicted in FIG. 25B, the DSS pod and the ML pod may be deployed in the different centralized nodes/cloud nodes (an architecture to segregate the ML functionality into a dedicated server) and to facilitate an inter-pod communication between the DSS pod and the ML pod. In such scenarios, the inter-pod communication may be performed using D deep dive into data plane development kit (DPDK) rings over the NIC.

Figure 26:
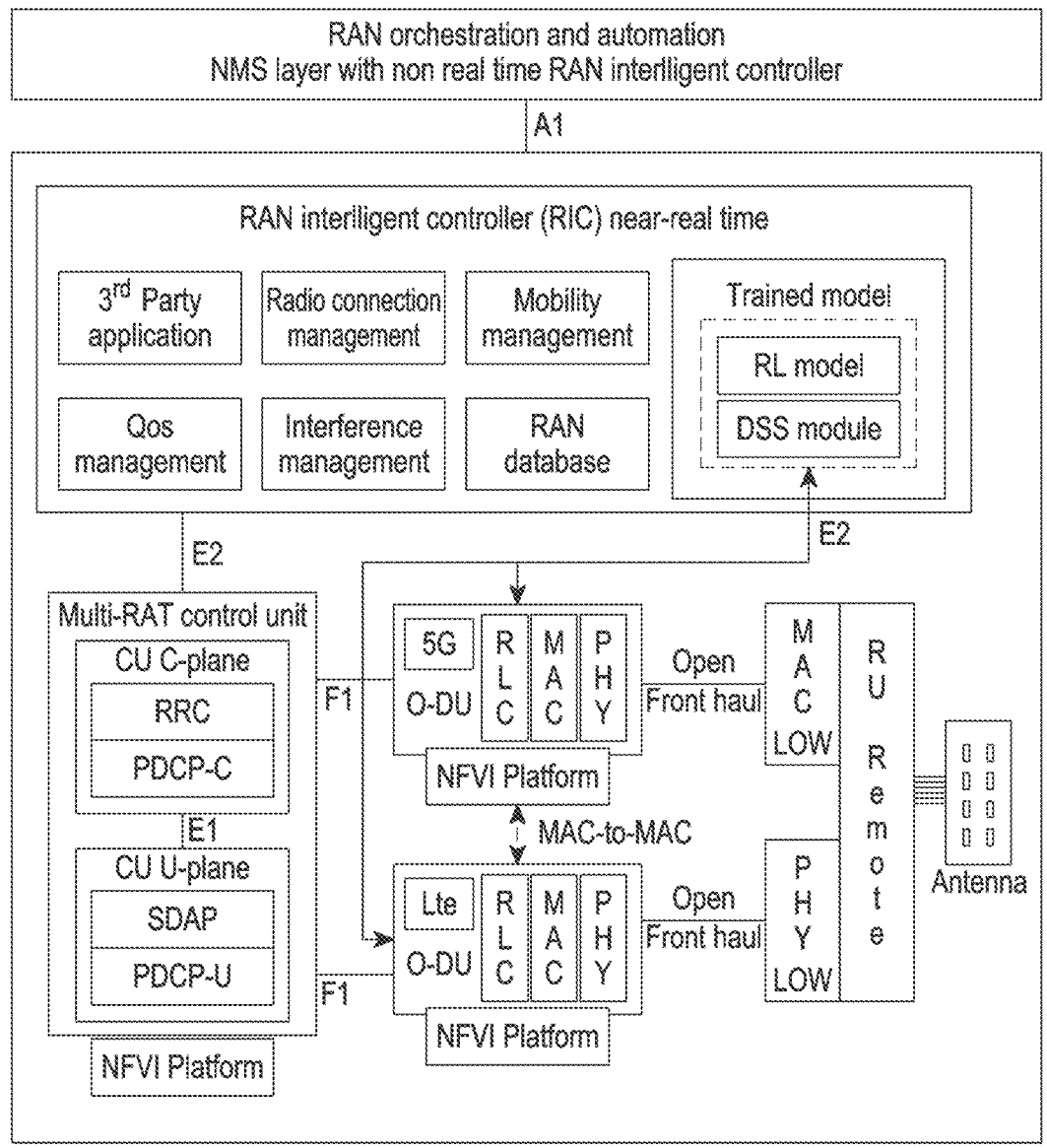
FIG. 26 is a diagram illustrating example implementation of the DSS policy determination as a part of a near-real time RAN intelligent controller (Near RT-RIC) module, according to various example embodiments.

FIG. 26 is an example diagram depicting implementation of the DSS policy determination as a part of a near-real time RAN intelligent controller (near RT-RIC) module which may comprise circuitry, according to certain example embodiments.

The DSS policy determination describe in the above-embodiments may be easily integrated with the O-RAN (an example of the RAN 204) for wider deployment. The DSS policy determination may be implemented as a part of the near-RT-RIC module and may benefit from an existing infrastructure flexibility. The near-RT-RIC module customizes network optimization for each network environment and use case. Virtualization (NVF or containers) creates an application infrastructure and a cloud-native environment for the Near-RT-RIC module.

The near-RT-RIC module leverages an embedded intelligence and performs at least one of, per-UE controller load-balancing, RB management, interference detection and mitigation, QoS management, connectivity management, seamless handover control, and so on. The near-RT-RIC module may be deployed as at least one of, a virtual network function (VNF), a set of virtual machines (VMs), a containerized network function (CNF), and so on. The near-RT-RIC module may provide a scalable platform to on-board third party control applications. The near-RT-RIC module leverages a radio-network information base (R-NIB) database, which captures the near real-time state of the underlying network. The R-NIB database may be used to train the RL based Q-learning module 502*a* to facilitate radio resource management for the UE/subscriber.

The RL based Q-learning module 502*a* and the DSS policy determination module 600 may be deployed as a part of a "trained model" module of the Near-RT-RIC module, wherein the UE/cell KPI metrics and system administration information may be readily available on broader visibility across the multi-RATs.

Embodiments herein enable the Near-RT-RIC module to derive the optimal DSS pattern and the DSS pattern duration (as described in the above embodiments) and relay the DSS pattern and the DSS pattern duration to the RAN 204 through an existing O-RAN interface E2, towards an O-DU module which may comprise circuitry.

The embodiments disclosed herein can be implemented through at least one software program running on at least one hardware device and performing network management functions to control the elements. The elements shown in FIGS. 2, 5, and 6 can be at least one of a hardware device, or a combination of hardware device and software module.

Certain example embodiments herein describe methods and systems for determining a DSS policy across multiple RATs. Therefore, it is understood that the scope of the protection is extended to such a program and in addition to a computer readable means (e.g., storage/memory) having a message therein, such computer readable storage means contain program code means for implementation of one or more operations of the method, when the program runs on a server or mobile device or any suitable programmable device. The method is implemented in embodiments through or together with a software program written in e.g., very high speed integrated circuit hardware description language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. Embodiments described herein could be implemented partly in hardware and partly in software. Concepts herein may be implemented on different hardware devices, e.g., using a plurality of CPUs.

The foregoing description of the specific embodiments discloses various example embodiments herein so that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Thus, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for determining a dynamic spectrum sharing (DSS) policy across multiple radio access technologies (RATs), the method comprising:
    determining, by a centralized node, a user equipment (UE) resource scaling factor for each of a plurality of UEs corresponding to at least one previous scheduling result based on at least one of: a UE learning rate of each UE, a previous radio resource requirements of each UE, or a UE spectral efficiency achieved by each UE for the at least one previous scheduling result;
    determining, by the centralized node, radio resource requirements of each of the plurality of UEs based on the UE resource scaling factor of each UE;
    determining, by the centralized node, cumulative radio resource requirements of the plurality of UEs based on the radio resource requirements of each UE; and
    determining, by the centralized node, the DSS policy for scheduling radio resources based on the cumulative radio resource requirements of the plurality of UEs, and based on cell key performance indicator (KPI) metrics or a plurality of DSS scaling factors.

2. The method of claim 1, wherein determining, by the centralized node, the UE resource scaling factor for each UE in the plurality of UEs comprises:
    receiving a UE priority list depicting the plurality of UEs to be considered in determining the DSS policy from a radio access network (RAN);
    enabling the RAN to allocate air resources to each of the plurality of UEs in the UE priority list based on UE KPI metrics and the cell KPI metrics monitored for at least one previous scheduling result of scheduling the radio resources;
    creating a UE reward matrix for each UE by analyzing the UE KPI metrics and the UE priority list;
    determining the UE spectral efficiency achieved by each UE for the at least one previous scheduling result from the UE reward matrix, wherein the UE spectral efficiency achieved by each UE is at least in terms of the performance parameters of the respective UE in the at least one previous scheduling result;
    generating a UE learning queue by analyzing the UE KPI metrics and the UE spectral efficiency achieved for the at least one previous scheduling result;
    determining the UE learning rate of each UE for the at least one previous scheduling result based on the generated UE learning queue; and
    determining the UE resource scaling factor for each UE corresponding to the at least one previous scheduling result based on at least one of: the UE learning rate of each UE, the previous radio resource requirements of each UE, and the UE spectral efficiency achieved by each UE for the at least one previous scheduling result.

3. The method of claim 2, wherein the UE priority list is determined based at least on an active UE list with non-zero data requirements and previously available performance parameters of each UE, wherein the previously available performance parameters of the UE include at least one of: the UE KPI metrics and policy parameters; and wherein the UE KPI metrics include at least one of: throughput, a reception/transmission (Rx/Tx) error, a scheduling frequency, link adaptation, power control metric, a multi-input multi-output, reference signals, data requirements, and mobility.

4. The method of claim 2, further comprising:
    updating the UE reward matrix for each UE based at least on spectral efficiency data
    measured for each UE for each scheduling result,
    wherein the UE reward matrix created for the UE includes:
        a row index as a UE KPI index determined based on the UE KPI metrics monitored in the at least one previous scheduling result; and
        a column index as a resource block size determined based on the previous resource requirements of the UE.

5. The method of claim 2, wherein generating the UE learning queue includes:
    analyzing the UE KPI metrics and the UE spectral efficiency achieved for the at least one previous scheduling result via an epsilon greedy method to generate the UE learning queue,
    wherein the UE learning queue includes:
        a row index as the UE KPI metrics; and
        a column index as a spectral efficiency index determined based on the UE spectral efficiency achieved for the at least one previous scheduling result.

6. The method of claim 1, wherein determining, by the centralized node, the radio resource requirements of each UE includes:
    creating a shared radio resource allocation table among the plurality of UEs based on the UE KPI metrics, the current traffic requirements of each UE, and the individual UE resource scaling factor, wherein the shared allocation table indicates the total available radio resources per DSS cell, the radio resources allocated for each UE, and remaining available radio resources for allocation among UEs;
    determining previous radio resource requirements of each UE from the created shared radio resource allocation table, wherein the previous radio resource requirements of the UE indicates radio resource requirements of the UE for the at least one previous scheduling result; and determining the radio resource requirements of each UE by updating the previous radio resource requirements of each UE using the respective UE resource scaling factor determined based on the UE learning rate, wherein the radio resource requirements of each UE indicates the radio resources required by the UE for the multiple RATs, wherein a constructive heuristic based recursive method is used to determine the radio resource requirements of each UE at least by updating the previous radio resource requirements of each UE based on the respective UE resource scaling factor.

7. The method of claim 1, wherein determining the DSS policy includes:

determining a DSS pattern that includes radio resource sharing information between the multiple RATs; and determining a DSS pattern duration that includes a valid time duration applicable for the DSS policy selected in terms of continuous slots and/or radio frames for the given DSS pattern.

8. The method of claim 7, wherein the radio resource sharing information comprises a slot-based (S-DSS) policy resource sharing and/or a frame-based (F-DSS) policy resource sharing, wherein the S-DSS policy resource sharing is in a frequency domain of each radio slot, wherein the F-DSS policy resource sharing is in a time domain of a radio frame.

9. The method of claim 7, wherein determining the DSS pattern includes:

collecting the cell KPI metrics monitored for the at least one previous scheduling result and a current DSS policy, wherein the cell KPI metrics include at least one of: throughput, block error, and total radio link failure; and wherein the current DSS policy includes a current DSS pattern and a current DSS pattern duration;

creating a DSS reward matrix for the at least one previous scheduling result at least by analyzing the collected cell KPI metrics and the current DSS policy;

determining cell spectral efficiency achieved for the at least one previous scheduling result based on the created DSS reward matrix, wherein the cell spectral efficiency achieved for the at least one previous scheduling result indicates spectral efficiency achieved with respect to the cell KPI metrics for the at least one previous scheduling result;

generating a cell learning queue for the at least one previous scheduling result at least by analyzing the cell spectral efficiency achieved with respect to the cell KPI metrics for the at least one previous scheduling result;

determining a cell learning rate for the at least one previous scheduling result based on the generated cell learning queue;

creating a DSS pattern scaling factor table based on at least one of: a previously applied DSS pattern, the cell spectral efficiency achieved for the at least one previous scheduling result, a status of each of the plurality of UEs, and the cell learning rate;

determining a DSS pattern scaling factor for the at least one previous scheduling result based on the created DSS pattern scaling factor table, wherein the DSS pattern scaling factor is one of the plurality of DSS scaling factors;

using a constructive heuristic based recursive method to update the DSS pattern scaling factor determined for the at least one previous scheduling result based on the previously applied DSS pattern, the status of each of the plurality of UEs, the cell learning rate, and cell performance parameters;

storing the updated DSS pattern scaling factor in the DSS scaling factor table;

determining the DSS pattern by scaling the current DSS pattern using at least one of: the updated DSS pattern scaling factor, the cumulative radio resource requirements of the plurality of UEs, and a UE resource requirement ratio, wherein the UE resource requirement ratio indicates a ratio of the radio resources required by the UE for the multiple RATs; and storing the determined DSS pattern in a DSS pattern table, wherein the DSS pattern table indicates various DSS patterns, wherein each DSS pattern is indicated by at least a pattern index.

10. The method of claim 9, wherein:

the DSS reward matrix includes a row index as a cell KPI index determined based on the cell KPI metrics and a column index as a DSS policy index determined based on the current DSS policy;

the cell learning queue includes a row index as the cell KPI index and a column index as a spectral efficiency index calculated based on the cell spectral efficiency achieved for the at least one previous scheduling result; and the DSS pattern scaling factor table includes a row index determined based on the previously applied DSS pattern and a column index determined based on the cell learning rate.

11. The method of claim 7, wherein determining the DSS pattern duration includes:

creating a DSS pattern duration scaling factor table for the at least one previous scheduling result based on a previously applied DSS pattern duration, and the cell learning rate, wherein the DSS pattern duration scaling factor table includes a row index determined based on the previously applied DSS pattern duration, and a column index determined based on the cell learning rate;

determining a DSS pattern duration scaling factor from the DSS pattern duration scaling factor table for the at least one previous scheduling result, wherein the DSS pattern duration scaling factor is one of the plurality of DSS scaling factors;

updating the DSS pattern duration scaling factor determined for the at least one previous scheduling result based on at least one of: the cell learning rate, the cell spectral efficiency, the status of each of the plurality of UEs, and the scaled DSS pattern; and determining the DSS pattern duration by scaling the current DSS pattern duration using the updated DSS pattern duration scaling factor.

12. The method of claim 1, further comprising:

determining, by the centralized node, the DSS policy at least by following multiple RAT scheduling coordination and restriction, wherein the multiple RAT scheduling coordination and restriction includes at least one of: shared resource coordination, interference reduction, and communicating radio metrics between the multiple RATs with an absence of a direct interface.

13. The method of claim 1, wherein:

the multiple RATs operating in a same frequency band share a same spectrum between each other with an absence of spectrum re-farming; and the multiple RATs operate as coherent to standard co-existence mechanisms to reduce interference with each other, wherein the standard co-existence mechanisms include rate matching around reference signals to align subcarrier positioning.

14. A centralized node comprising:
a processing circuitry;
memory storing instructions, that, when executed by the processing circuitry, cause the centralized node to:
determine a user equipment (UE) resource scaling factor for each of a plurality of UEs corresponding to at least one previous scheduling result based on at least one of: a UE learning rate of each UE, a previous radio resource requirements of each UE, or a UE spectral efficiency achieved by each UE for the at least one previous scheduling result;
determine radio resource requirements of each of the plurality of UEs via at least the UE resource scaling factor of each UE;
determine cumulative radio resource requirements of the plurality of UEs based on the radio resource requirements of each UE; and
determine the DSS policy for scheduling radio resources based on
the cumulative radio resource requirements of the plurality of UEs, and based on cell key performance indicator (KPI) metrics or a plurality of DSS scaling factors.

15. The centralized node of claim 14, wherein the processing circuitry is further configured to:
receive a UE priority list depicting the plurality of UEs to be considered in determining the DSS policy from a Radio Access Network (RAN);
enable the RAN to allocate air resources to each of the plurality of UEs in the UE priority list based on UE KPI metrics and the cell KPI metrics monitored for at least one previous scheduling result of scheduling the radio resources;
create a UE reward matrix for each UE by analyzing the UE KPI metrics and the UE priority list via a reinforcement learning (RL) based Q-learning module comprising circuitry;
determine the UE spectral efficiency achieved by each UE for the at least one previous scheduling result from the UE reward matrix, wherein the UE spectral efficiency achieved by each UE is at least in terms of the performance parameters of the respective UE in the at least one previous scheduling result;
generate a UE learning queue by analyzing the UE KPI metrics and the UE spectral efficiency achieved for the at least one previous scheduling result;
use the RL based-Q learning module to determine a UE learning rate of each UE for the at least one previous scheduling result based on the generated UE learning queue; and
determine the UE resource scaling factor for each UE corresponding to the at least one previous scheduling result based on at least one of: the UE learning rate of each UE, the previous radio resource requirements of each UE, and the UE spectral efficiency achieved by each UE for the at least one previous scheduling result.

16. The centralized node of claim 15, wherein the processing circuitry is further configured to:
create a shared radio resource allocation table among the plurality of UEs based on the UE KPI metrics, the current traffic requirements of the UE, and the individual UE resource scaling factor, wherein the shared allocation table indicates at least the total available radio resources per DSS cell, the radio resources allocated for each UE, and remaining available radio resources for allocation among UEs;
determine the previous radio resource requirements of each UE from the created shared radio resource allocation table, wherein the previous radio resource requirements of the UE indicates radio resource requirements of the UE for the at least one previous scheduling result;
determine the radio resource requirements of each UE at least by updating the previous radio resource requirements of each UE based on the respective UE resource scaling factor determined based on the UE learning rate, wherein the radio resource requirements of each UE indicates the radio resources required by the UE for the multiple RATs.

17. The centralized node of claim 14, wherein the processing circuitry is further configured to determine the DSS policy at least by:
determining a DSS pattern that includes radio resource sharing information between the multiple RATs; and
determining a DSS pattern duration that includes a valid time duration applicable for the DSS policy selected in terms of continuous slots or radio frames for the given DSS pattern.

18. The centralized node of claim 17, wherein the processing circuitry is further configured to:
collect the cell KPI metrics monitored for the at least one previous scheduling result and a current DSS policy, wherein the cell KPI metrics include at least one of: throughput, block error, and total radio link failure; and wherein the current DSS policy includes a current DSS pattern and a current DSS pattern duration;
create a DSS reward matrix for the at least one previous scheduling result by analyzing the collected cell KPI metrics and the current DSS policy via the RL module;
determine cell spectral efficiency achieved for the at least one previous scheduling result based on the created DSS reward matrix, wherein the cell spectral efficiency achieved for the at least one previous scheduling result indicates spectral efficiency achieved with respect to the cell KPI metrics for the at least one previous scheduling result;
generate a cell learning queue for the at least one previous scheduling result by analyzing the cell spectral efficiency achieved with respect to the cell KPI metrics for the at least one previous scheduling result;
determine a cell learning rate for the at least one previous scheduling result based on the generated cell learning queue;
create a DSS pattern scaling factor table based on at least one of: a previously applied DSS pattern, the cell spectral efficiency achieved for the at least one previous scheduling result, a status of each of the plurality of UEs, and the cell learning rate;
determine a DSS pattern scaling factor for the at least one previous scheduling result based on the created DSS pattern scaling factor table, wherein the DSS pattern scaling factor is one of the plurality of DSS scaling factors;
use a constructive heuristic based recursive technique to update the DSS pattern scaling factor determined for the at least one previous scheduling result based on the previously applied DSS pattern, the status of each of the plurality of UEs, the cell learning rate, and cell performance parameters;
store the updated DSS pattern scaling factor in the DSS scaling factor table;

determine the DSS pattern by scaling the current DSS pattern using at least one of, the updated DSS pattern scaling factor, the cumulative radio resource requirements of the plurality of UEs, and a UE resource requirement ratio, wherein the UE resource requirement ratio indicates a ratio of the radio resources required by the UE for the multiple RATs; and store the determined DSS pattern in a DSS pattern table, wherein the DSS pattern table indicates various DSS patterns, wherein each DSS pattern is indicated by a pattern index.

19. The centralized node of claim 17, wherein the processing circuitry is further configured to:

create a DSS pattern duration scaling factor table for the at least one previous scheduling result based on a previously applied DSS pattern duration, and the cell learning rate, wherein the DSS pattern duration scaling factor table includes a row index determined based on the previously applied DSS pattern duration, and a column index determined based on the cell learning rate;

determine a DSS pattern duration scaling factor from the DSS pattern duration scaling factor table for the at least one previous scheduling result, wherein the DSS pattern duration scaling factor is one of the plurality of DSS scaling factors;

update the DSS pattern duration scaling factor determined for the at least one previous scheduling result based on at least one of: the cell learning rate, the cell spectral efficiency, the status of each of the plurality of UEs, and the scaled DSS pattern; and determine the DSS pattern duration at least by scaling the current DSS pattern duration using the updated DSS pattern duration scaling factor.

* * * * *